711/162, 165
See application file for complete search history.

(12) United States Patent
Nasu et al.

(10) Patent No.: US 9,081,509 B2
(45) Date of Patent: Jul. 14, 2015

(54) SYSTEM AND METHOD FOR MANAGING A PHYSICAL STORAGE SYSTEM AND DETERMINING A RESOURCE MIGRATION DESTINATION OF A PHYSICAL STORAGE SYSTEM BASED ON MIGRATION GROUPS

(71) Applicant: Hitachi, Ltd., Tokyo (JP)

(72) Inventors: Hiroshi Nasu, Yokohama (JP); Mioko Moriguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 328 days.

(21) Appl. No.: 13/642,002

(22) PCT Filed: Oct. 3, 2012

(86) PCT No.: PCT/JP2012/006338
§ 371 (c)(1),
(2) Date: Oct. 18, 2012

(87) PCT Pub. No.: WO2014/054070
PCT Pub. Date: Apr. 10, 2014

(65) Prior Publication Data
US 2015/0026421 A1 Jan. 22, 2015

(51) Int. Cl.
*G06F 12/00* (2006.01)
*G06F 3/06* (2006.01)
(52) U.S. Cl.
CPC .............. *G06F 3/0647* (2013.01); *G06F 3/061* (2013.01); *G06F 3/067* (2013.01); *G06F 3/0619* (2013.01)
(58) Field of Classification Search
CPC ..... G06F 3/0647; G06F 3/0619; G06F 3/061; G06F 3/067

(56) References Cited

U.S. PATENT DOCUMENTS

| | | | |
|---|---|---|---|
| 8,589,651 B2 * | 11/2013 | Kobayashi et al. | 711/165 |
| 8,621,178 B1 * | 12/2013 | Lazar | 711/173 |
| 2006/0212673 A1 * | 9/2006 | Fukuguchi et al. | 711/173 |
| 2010/0180078 A1 | 7/2010 | Satoyama et al. | |
| 2012/0102201 A1 | 4/2012 | Nakagawa et al. | |
| 2012/0203978 A1 | 8/2012 | Hori et al. | |
| 2013/0198482 A1 * | 8/2013 | Ripberger | 711/170 |

FOREIGN PATENT DOCUMENTS

EP   1 821 186 A2   8/2007

OTHER PUBLICATIONS

PCT International Search Report and Written Opinion on application PCT/JP2012/006338 mailed Mar. 21, 2013; 12 pages.

* cited by examiner

*Primary Examiner* — John Lane
(74) *Attorney, Agent, or Firm* — Foley & Lardner LLP

(57) ABSTRACT

An example is a method for determining at least one migration destination for resources of one migration source physical storage system, with physical storage systems, which provide resources to a virtual storage system recognized by a host as one storage system, as migration destination candidates. The method defines at least one migration group from the resources included in the migration source physical storage system so that resources for which the predetermined management permissions are assigned to the same administrator are included in the same migration group, and determines at least one migration destination of the at least one migration group, on a condition that resources in the same migration group are migrated to the same physical storage system among the physical storage systems.

19 Claims, 28 Drawing Sheets

Fig. 5

USER MANAGEMENT TABLE (PSTA) — 2310

| USER ID (2311) | PASSWORD (2312) | UGID (2313) |
|---|---|---|
| USER 01 | ********** | UG01 |
| USER 02 | ********** | UG02 |
| USER 03 | ********** | UG03 |

Fig. 6

ROLE MANAGEMENT TABLE (PSTA) — 2320

| ROLE ID (2321) | PERMISSION (2322) |
|---|---|
| ROLE 1 | SECURITY ADMIN (VIEW) |
| ROLE 2 | STORAGE ADMIN (VIEW/MODIFY) |

Fig. 7

| RESOURCE MANAGEMENT TABLE (PSTA) 2330 | | |
|---|---|---|
| 2331 | 2332 | 2333 |
| RESOURCE TYPE | RESOURCE ID | RSGID |
| PORT | PT01 | RSG01 |
| PORT | PT02 | RSG01 |
| PORT | PT03 | RSG02 |
| PORT | PT04 | RSG02 |
| PORT | PT05 | RSG03 |
| PORT | PT06 | RSG03 |
| HOST GROUP | HG01 | RSG01 |
| HOST GROUP | HG02 | RSG01 |
| HOST GROUP | HG03 | RSG02 |
| HOST GROUP | HG04 | RSG02 |
| HOST GROUP | HG05 | RSG03 |
| HOST GROUP | HG06 | RSG03 |
| VOLUME | VOL01 | RSG04 |
| VOLUME | VOL02 | RSG04 |
| VOLUME | VOL03 | RSG04 |
| VOLUME | VOL04 | RSG05 |
| VOLUME | VOL05 | RSG05 |
| VOLUME | VOL06 | RSG06 |
| VOLUME | VOL07 | RSG06 |
| PARITY GROUP | PG01 | RSG07 |

Fig. 9

ASSOCIATED RESOURCE GROUP MANAGEMENT TABLE (PSTA) 2350

| RSGID (2351) | ASSOCIATED RSGID (2352) |
|---|---|
| RSG01 | RSG04 |
| RSG02 | NULL |
| RSG03 | RSG06 |
| RSG04 | RSG01 |
| RSG05 | NULL |
| RSG06 | RSG03 |

Fig. 10A

| HOST GROUP MANAGEMENT TABLE (PSTA) 2381A | | | |
|---|---|---|---|
| HOST GROUP ID 2381Aa | PORT ID 2381Ab | HOST WWN 2381Ac | VOLUME ID 2381Ad |
| HG01 | PT01 | WWN01 | VOL01 |
| HG02 | PT02 | NULL | NULL |
| HG03 | PT03 | NULL | NULL |
| HG04 | PT04 | NULL | NULL |
| HG05 | PT05 | NULL | VOL06 |
| HG06 | PT06 | NULL | NULL |

Fig. 10B

VOLUME MANAGEMENT TABLE (PSTA) 2382A

| VOLUME ID | PGID | CAPACITY |
|---|---|---|
| VOL01 | PG01 | 200GB |
| VOL02 | PG01 | 50GB |
| VOL03 | PG01 | 100GB |
| VOL04 | PG01 | 100GB |
| VOL05 | PG01 | 100GB |
| VOL06 | PG01 | 50GB |
| VOL07 | PG01 | 50GB |

Fig. 10C

PARITY GROUP MANAGEMENT TABLE (PSTA) 2383A

| PGID | TOTAL CAPACITY | FREE CAPACITY |
|---|---|---|
| PG01 | 1000GB | 350GB |

Fig. 10D

| VIRTUAL STORAGE TABLE 2384 | |
|---|---|
| VIRTUAL STORAGE SYSTEM ID 2384a | PHYSICAL STORAGE SYSTEM ID 2384b |
| VST1 | PSTB |
| VST1 | PSTC |

Fig. 11A

HOST GROUP MANAGEMENT TABLE (PSTB) 2381B

| HOST GROUP ID 2381Ba | PORT ID 2381Bb | HOST WWN 2381Bc | VOLUME ID 2381Bd |
|---|---|---|---|
| HG01 | PT01 | WWN11 | VOL01 |
| HG02 | PT02 | WWN12 | VOL02 |
| HG03 | PT03 | NULL | NULL |
| HG04 | PT04 | NULL | NULL |
| HG05 | PT05 | NULL | NULL |
| HG06 | PT06 | NULL | NULL |

Fig. 11B

VOLUME MANAGEMENT TABLE (PSTB) 2382B

| VOLUME ID 2382Ba | PGID 2382Bb | CAPACITY 2382Bc |
|---|---|---|
| VOL01 | PG01 | 250GB |
| VOL02 | PG01 | 250GB |

Fig. 11C

PARITY GROUP MANAGEMENT TABLE (PSTB) 2383B

| PGID 2383Ba | TOTAL CAPACITY 2383Bb | FREE CAPACITY 2383Bc |
|---|---|---|
| PG01 | 1000GB | 500GB |

Fig. 12A

HOST GROUP MANAGEMENT TABLE (PSTC) 2381C

| HOST GROUP ID 2381Ca | PORT ID 2381Cb | HOST WWN 2381Cc | VOLUME ID 2381Cd |
|---|---|---|---|
| HG01 | PT01 | NULL | NULL |
| HG02 | PT02 | NULL | NULL |
| HG03 | PT03 | NULL | NULL |
| HG04 | PT04 | NULL | NULL |
| HG05 | PT05 | WWN21 | VOL01 |
| HG06 | PT06 | WWN22 | VOL02 |

Fig. 17A

|  | 3321 |  |
|---|---|---|
| RESOURCE MIGRATION GROUP MANAGEMENT TABLE A | | |
| MIGRATION GROUP ID (3321a) | RSGID (3321b) | MIGRATION DESTINATION STORAGE ID (3321c) |
| MG01 | RSG01 | NULL |
| MG01 | RSG02 | NULL |
| MG01 | RSG03 | NULL |
| MG01 | RSG04 | NULL |
| MG02 | RSG05 | PSTB |
| MG02 | RSG06 | PSTB |

Fig. 17B

|  | 3322 |  |
|---|---|---|
| RESOURCE MIGRATION GROUP MANAGEMENT TABLE B | | |
| MIGRATION GROUP ID (3322a) | PORT COUNT (3322b) | VOLUME CAPACITY (3322c) |
| MG01 | 4 | 550GB |
| MG02 | 2 | 100GB |

Fig. 18A

RESOURCE MIGRATION GROUP MANAGEMENT TABLE A

| MIGRATION GROUP ID | RSGID | MIGRATION DESTINATION STORAGE ID |
|---|---|---|
| MG01 | RSG01 | PSTB |
| MG03 | RSG02 | PSTC |
| MG01 | RSG03 | PSTB |
| MG03 | RSG04 | PSTC |
| MG02 | RSG03 | PSTB |
| MG02 | RSG06 | PSTB |

Fig. 18B

RESOURCE MIGRATION GROUP MANAGEMENT TABLE B

| MIGRATION GROUP ID | PORT COUNT | VOLUME CAPACITY |
|---|---|---|
| MG01 | 2 | 350GB |
| MG02 | 2 | 100GB |
| MG03 | 2 | 200GB |

Fig. 22

VIRTUAL STORAGE TABLE 2385

| VIRTUAL STORAGE ID 2385a | PHYSICAL STORAGE ID 2385b | RESOURCE TYPE 2385c | RESOURCE ID 2385d |
|---|---|---|---|
| VSTA | PSTB | PORT | PT01 |
| VSTA | PSTB | PORT | PT02 |
| VSTA | PSTB | PORT | PT03 |
| VSTA | PSTB | HOST GROUP | HG01 |
| VSTA | PSTB | HOST GROUP | HG02 |
| VSTA | PSTB | HOST GROUP | HG03 |
| VSTA | PSTB | VOLUME | VOL01 |
| VSTA | PSTB | VOLUME | VOL02 |
| VSTA | PSTB | VOLUME | VOL03 |
| VSTB | PSTC | PORT | PT05 |
| VSTB | PSTC | PORT | PT06 |
| VSTB | PSTC | HOST GROUP | HG05 |
| VSTB | PSTC | HOST GROUP | HG06 |
| VSTB | PSTC | VOLUME | VOL01 |
| VSPB | PSTC | VOLUME | VOL02 |

SYSTEM AND METHOD FOR MANAGING A PHYSICAL STORAGE SYSTEM AND DETERMINING A RESOURCE MIGRATION DESTINATION OF A PHYSICAL STORAGE SYSTEM BASED ON MIGRATION GROUPS

TECHNICAL FIELD

This invention relates to a management system for managing a physical storage system, a method of determining a resource migration destination of a physical storage system, and a storage medium.

BACKGROUND ART

A storage system coupled to a host computer via a network includes, for example, a plurality of magnetic disks as storage devices for storing data. The storage system uses the technology of redundant arrays of independent disks (RAID) to give redundancy to a storage area of the plurality of storage devices, and thereby build RAID groups (also called parity groups).

The storage system also provides the host computer with, in the form of logical volumes, a storage area having a capacity that is requested by the host computer from a part of the RAID groups. As logical volumes of storage systems in general, there are ones constituted of the storage area of a high-performance, expensive storage device, ones constituted of the storage area of a low-performance, inexpensive storage device, and a set of logical volumes different from one another in the degree of RAID configuration redundancy, from which a selection is made depending on the use.

In recent years, a storage system management method that is in demand for largescale storage integration environments, where one storage system is shared by a plurality of companies, a plurality of departments, or the like, is multi-tenancy-type management method which places an administrator for each company or each department so that the storage system is managed by the respective administrators. This lessens the burden on an administrator of a storage system.

There is also a technology for bundling a plurality of physical storage systems together to provide as one virtual storage system to a host computer (for example, see PTL 1). This technology enables a plurality of companies, a plurality of departments, or the like to share a plurality of physical storage systems.

CITATION LIST

Patent Literature

PTL 1: US 2010/0180078

SUMMARY OF INVENTION

Technical Problem

To migrate resources (ports, volumes, RAID groups, and the like) of one physical storage system (migration source physical storage system) to a virtual storage environment that includes a plurality of migration destination physical storage systems, the placement of migrated resources varies depending on the free-resource states of the respective migration destination physical storage systems. The migrated resources are migrated to one migration destination physical storage system in some cases and are distributed among different physical storage systems in other cases.

In the case where resources (for example, a port and a volume) allocated to one host computer in the virtual storage environment are in different physical storage systems, in order to enable the host computer to access one of the resources (for example, a volume) after the resource migration, the resource (for example, a volume) needs to be mapped between the physical storage systems. When the host computer accesses the volume in this case, causing communication between the physical storage systems, the host I/O performance in the virtual storage environment may deteriorate from the performance prior to the resource migration, depending on the performance of the communication.

Solution to Problem

An aspect of the invention is a management system for managing a first physical storage system and a plurality of physical storage systems which provide a plurality of resources to a virtual storage system recognized by a host as one storage system. The management system includes: storage for holding management permission information, which associates a plurality of resources that are included in the first physical storage system with permissions of a plurality of administrators; and a processor for determining migration destinations of the plurality of resources that are included in the first physical storage system, with the plurality of physical storage systems as migration destination candidates. The processor refers to the management permission information to identify resources for which predetermined management permissions are assigned respectively to the plurality of administrators in the first physical storage system. The processor defines at least one migration group from the plurality of resources that are included in the first physical storage system so that resources for which the predetermined management permissions are assigned to the same administrator are included in the same migration group. The processor determines at least one migration destination of the at least one migration group, on a condition that resources in the same migration group are migrated to the same physical storage system among the plurality of physical storage systems.

Advantageous Effects of Invention

According to the exemplary embodiment of this invention, the possibility of deterioration in host I/O performance is reduced in resource migration from a migration source physical storage system to a plurality of physical storage systems which provide resources to a virtual storage system.

BRIEF DESCRIPTION OF DRAWINGS

FIG. 5 is a diagram illustrating a configuration example of a user management table in a migration source physical storage system in the first embodiment.

FIG. 6 is a diagram illustrating a configuration example of a role management table in the migration source physical storage system in the first embodiment.

FIG. 7 is a diagram illustrating a configuration example of a resource management table in the migration source physical storage system in the first embodiment.

FIG. 9 is a diagram illustrating a configuration example of an associated resource group management table in the migration source physical storage system in the first embodiment.

FIG. 10A is a diagram illustrating a configuration example of a host group management table in the migration source physical storage system in the first embodiment.

FIG. 10B is a diagram illustrating a configuration example of a volume management table in the migration source physical storage system in the first embodiment.

FIG. 10C is a diagram illustrating a configuration example of a parity group management table in the migration source physical storage system in the first embodiment.

FIG. 10D is a diagram illustrating a configuration example of a virtual storage table in the migration source physical storage system in the first embodiment.

FIG. 11A is a diagram illustrating a configuration example of a host group management table in a migration destination candidate physical storage system B in the first embodiment.

FIG. 11B is a diagram illustrating a configuration example of a volume management table in the migration destination candidate physical storage system B in the first embodiment.

FIG. 11C is a diagram illustrating a configuration example of a parity group management table in the migration destination candidate physical storage system B in the first embodiment.

FIG. 12A is a diagram illustrating a configuration example of a host group management table in a migration destination candidate physical storage system C in the first embodiment.

FIG. 17A is a diagram illustrating a configuration example of a migration group management table A after a migration group is defined in the first embodiment.

FIG. 17B is a diagram illustrating a configuration example of a migration group management table B after a migration group is defined in the first embodiment.

FIG. 18A is a diagram illustrating a configuration example of the migration group management table A after a migration group is redefined in the first embodiment.

FIG. 18B is a diagram illustrating a configuration example of the migration group management table B after a migration group is redefined in the first embodiment.

FIG. 22 is a diagram illustrating a configuration example of a virtual storage table of the migration source physical storage system in the second embodiment.

DESCRIPTION OF EMBODIMENTS

Figure 1:
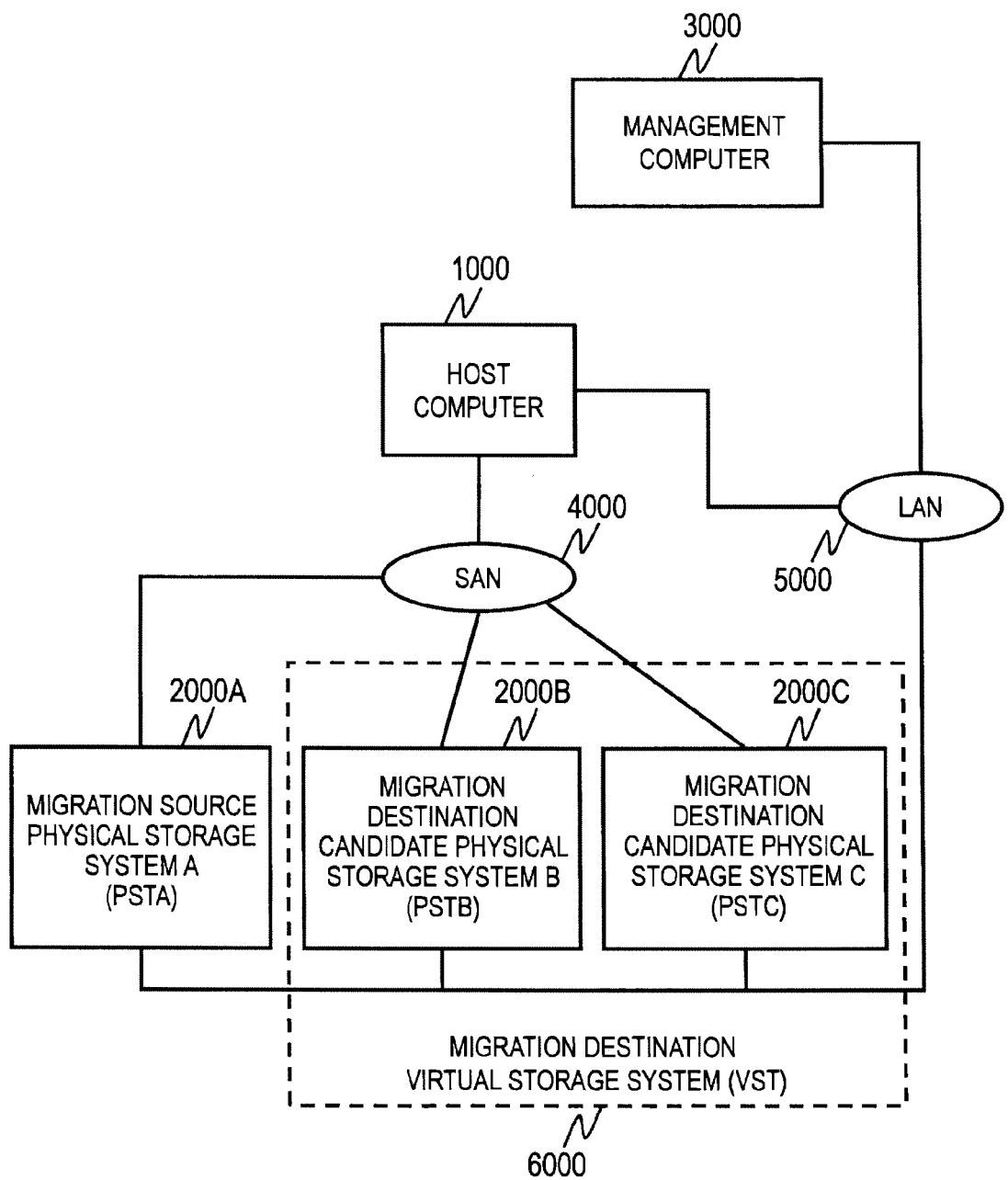
FIG. 1 is a diagram illustrating a configuration example of a computer system in a first embodiment of this invention.

Modes for carrying out this invention are described below through embodiments. The embodiments are provided for describing features of this invention, and are not to limit this invention. In the embodiments of this invention, the description thereof is made in detail enough for a person skilled in the art to carry out this invention, but it is necessary to understand that other implementations and modes are possible and that changes in configurations and structures and substitutions of diverse components can be made without departing from the scope and spirit of the technical idea of this invention.

Therefore, the following description should not be interpreted to be limited thereto. A component of one embodiment can be added to another embodiment or substituted by a component of another embodiment without departing from the scope of the technical idea of this invention. As described later, the embodiments of this invention may be implemented by software running on a general purpose computer, by dedicated hardware, or by a combination of software and hardware.

It should be noted that, in the following description, information used in the embodiments of this invention is described by mainly using the "table" form, but the information does not necessarily have to be expressed by the data structure based on the table, and may be expressed by data structures such as a list, a DB, and a queue, or in other such form. For that reason, "table", "list", "DB", and the like are sometimes referred to simply as "information" in order to indicate independence of the data structure. Further, the expressions "identification information", "identifier", "name", and "ID" can be used, and be substituted with one another.

The following description is made of each processing according to the embodiments of this invention by using a "program" as a subject (operation subject), but may be made by using a processor as the subject because the program performs predetermined processing by being executed by the processor while using a memory and a network port (communication control device).

Further, the processing disclosed by using the program as the subject may also be the processing performed by a computer, such as a management computer, or a computer system. A part or an entirety of the program may be realized by dedicated hardware or may be modularized.

A program, a table, a file, and other forms of information for implementing respective functions can be stored in a storage device such as a non-volatile semiconductor memory, a hard disk drive, or a solid state drive (SSD), or in a computer-readable, non-transient, data storage medium such as an IC card, an SD card, or a DVD, to be installed in the computer or the computer system from a program distributing server or the non-transient storage medium.

The processor operates as functional units that realize predetermined functions by operating in accordance with programs. For example, the processor functions as a control unit by operating in accordance with a control program, and functions as a management unit by operating in accordance with a management program. An apparatus or a system that includes the processor is an apparatus or a system that includes those functional units.

In the embodiments of this invention, resources of one migration source physical storage system are migrated to one virtual storage system. The migration destination virtual storage system is allocated resources of a plurality of physical storage systems, and resources of the migration source physical storage system are migrated to one of the plurality of physical storage systems.

The embodiments of this invention involve defining a migration group from among resources of the migration source physical storage system based on management permissions, and determining a migration destination physical storage system on a migration group-by-migration group basis. In short, all resources of a migration group are migrated to the same physical storage system.

Resources for which a specific management permission is assigned to the same administrator are likely to be allocated to one host computer. Therefore, by determining the unit of resource migration based on management permissions of administrators, resources that are likely to be allocated to a host computer are allocated to a single migration destination physical storage system, which reduces resource mapping (for example, volume mapping) between physical storage systems at the migration destination, and accordingly reduces the occurrence of host input/output (I/O) performance deterioration due to resource mapping.

First Embodiment

FIG. 1 is a configuration example of a computer system to which this invention is applied. The computer system of FIG. 1 includes a host computer 1000, physical storage systems 2000A, 2000B, and 2000C, and a management computer 3000. The physical storage system 2000A is a physical storage system that is a source of resource migration, whereas the physical storage systems 2000B and 2000C are each a physical storage system that is a candidate for the destination of the migration (also called a migration destination physical storage system).

The counts of the various apparatus (systems) included in the computer system depend on the design. The migration destination candidate physical storage systems 2000B and 2000C form one virtual storage system. While two physical storage systems form one virtual storage system in a virtual storage environment of this example, the count of constituent storage systems depends on the design.

The host computer 1000, the management computer 3000, and the physical storage systems 2000A to 2000C are coupled via a management network, which is constituted of a LAN 5000, in a manner that allows communication with one another. The management network 5000 is, for example, an IP network. The management network 5000 can be any type of network as long as the network is designed for management data communication.

The host computer 1000 and the physical storage systems 2000A to 2000C are coupled to one another via a data network which is constituted of a storage area network (SAN) 4000. The host computer 1000 accesses resources of the physical storage systems 2000A to 2000C. The data network 4000 can be any type of network as long as the network is designed for data communication. The data network 4000 and the management network 5000 may be the same network.

The two physical storage systems, 2000B and 2000C, are coupled in a manner that allows communication with each other, and are virtualized so that one virtual storage system 6000A is recognized by the host computer 1000.

The physical storage systems 2000B and 2000C can each receive from the host computer 1000 a request for I/O to and from its own volume (real volume) and a volume of the other physical storage system. The physical storage systems 2000B and 2000C each transfer a request for I/O to and from a volume of the other physical storage system to the other physical storage system.

For example, a volume (real volume) A of the physical storage system 2000C is mapped onto the physical storage system 2000B. When receiving a write request for the volume A and write data from the host computer 1000, the physical storage system 2000B transfers the write request and the write data to the physical storage system 2000C. The physical storage system 2000C writes the transferred write data in the volume A in accordance with the transferred write request.

When receiving a read request for the volume A from the host computer 1000, the physical storage system 2000B transfers the read request to the physical storage system 2000C. The physical storage system 2000C transfers read data of the volume A to the physical storage system 2000B in accordance with the transferred read request. The physical storage system 2000B transfers to the host computer 1000 the read data received from the physical storage system 2000C.

The physical storage systems 2000B and 2000C each have management information of its own volumes and volumes mapped from the other physical storage system, and refer to the management information to control access to the volumes. For example, one physical storage system defines a virtual volume corresponding to a real volume of the other, and an I/O request is transferred via the virtual volume.

The host computer 1000 can thus transmit an I/O request for I/O to and from the volume A to a port of whichever of the physical storage systems 2000B and 2000C.

For instance, a path switching program which runs on the host computer 1000 follows given rules to switch a path used to access the volume A. When, for example, a failure occurs in the currently used path to and from a port of one physical storage system, the current path is switched to a path to and from a port of the other physical storage system. The path switching program may switch paths to suit the communication state.

Figure 2:
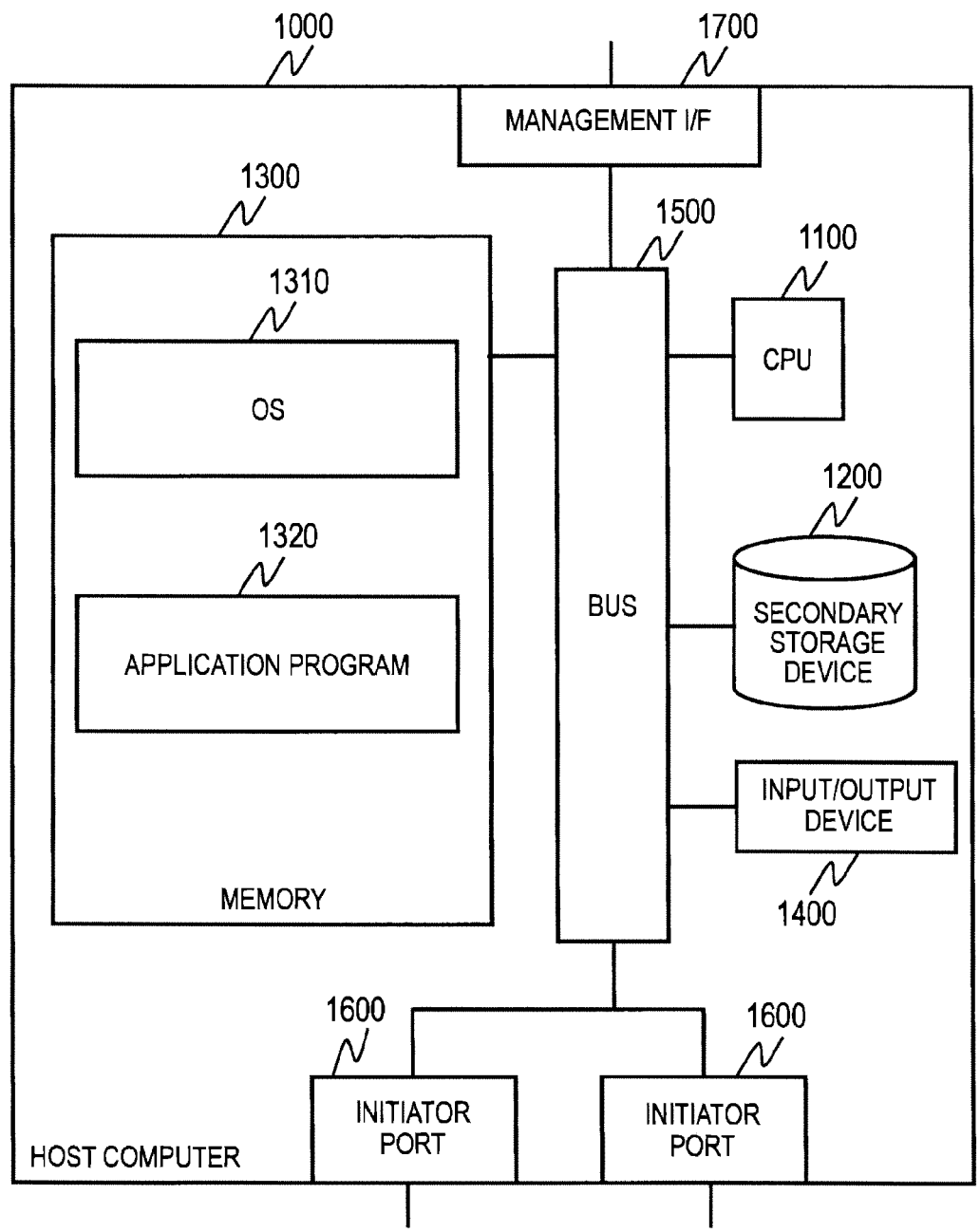
FIG. 2 is a diagram illustrating a configuration example of a host computer in the first embodiment.

FIG. 2 is a diagram schematically illustrating a configuration example of the host computer 1000. The host computer 1000 includes a central processing unit (CPU) 1100, which is a processor, a non-volatile secondary storage device 1200, a memory 1300, which is the main storage device, an input/output device 1400, initiator ports 1600, which are I/O request issuing side interfaces, and a management interface 1700. The components are connected by a bus 1500 in a manner that allows communication with one another.

The CPU 1100 operates as programmed by a program that is stored in the memory 1300. Typically, a program and data that are stored in the secondary storage device 1200 are loaded onto the memory 1300. The memory 1300 in this example holds an operating system (OS) 1310 and an application program 1320. The application program 1320 can read/write data in volumes provided by the physical storage systems 2000A to 2000C.

The initiator ports 1600 are network interfaces that are coupled to the SAN 4000. The initiator ports 1600 exchanges data and requests with the physical storage systems 2000A to 2000C over the SAN 4000.

The management interface 1700 is a network interface that couples to the LAN 5000. The management interface 1700 exchanges management data and control commands with the physical storage systems 2000A to 2000C over the LAN 5000. The management interface 1700 also exchanges management data and control commands with the management computer 3000 over the LAN 5000.

Figure 3:
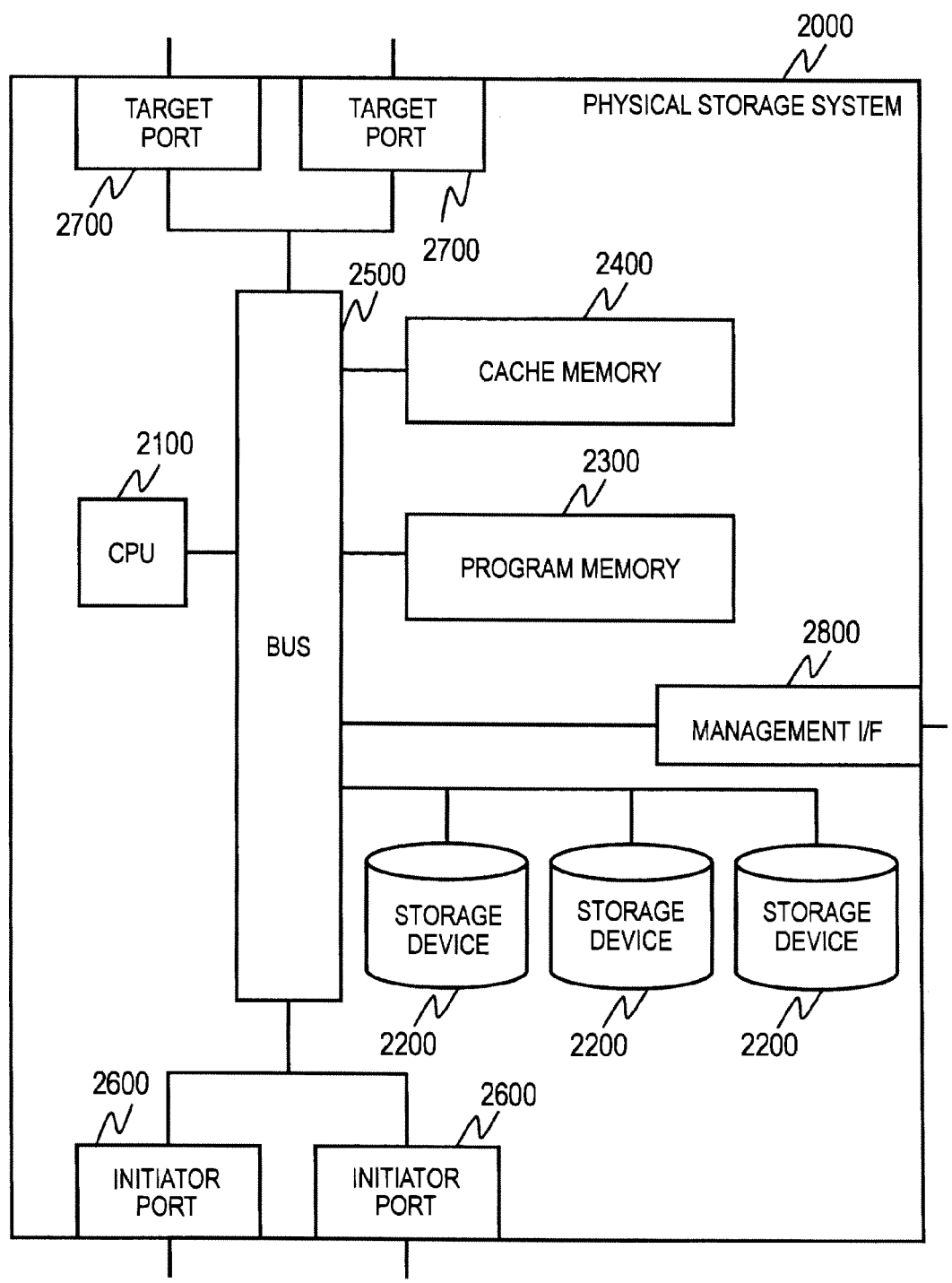
FIG. 3 is a diagram illustrating a configuration example of a physical storage system in the first embodiment.

FIG. 3 is a diagram schematically illustrating a hardware configuration example of the physical storage systems 2000A to 2000C. The term "physical storage system 2000" is hereinafter used to collectively refer to the physical storage systems 2000A to 2000C. The physical storage systems 2000A to 2000C in this example have the same basic configuration, but the count of components, storage capacity, and the like depend on the respective physical storage systems. The basic configuration may vary in these regards.

A storage system 2000 includes a plurality of storage devices (for example, hard disk drives or solid state drives (SSDs)) 2200 and a storage controller, which controls the physical storage system 2000 and performs volume management, data communication with the host computer 1000 or other physical storage systems, and the like.

The storage controller includes a CPU 2100, which is a processor, a program memory 2300, initiator ports 2600, which are I/O request issuing side interfaces, target ports 2700, which are I/O request receiving side interfaces, a management interface 2800, and a cache memory 2400 for data transfer. The components of the storage system 2000 are connected by a bus 2500 in a manner that allows communication with one another.

The storage system 2000 is coupled to external (other) physical storage systems via the initiator ports 2600, which allows the storage system 2000 to transmit I/O requests and write data (user data) to the external physical storage systems, and to receive read data (user data) from the external physical storage systems. The initiator ports 2006 couple to the SAN 4000.

The initiator ports 2600 have a function of converting a protocol that is used for communication with the external physical storage systems, such as FC, Fibre Channel over Ethernet (FCoE), or iSCSI, into a protocol that is used within the storage controller, for example, PCIe.

The storage system 2000 is coupled at the target ports 2700 to the host computer 1000 or external physical storage systems. The storage system 2000 receives I/O requests and writes data from the host computer 1000 or the external physical storage systems via the target ports 2700, and transmits read data to the host computer 1000 or the external physical storage systems via the target ports 2700. The target ports 2700 couple to the SAN 4000.

The target ports 2700 have a function of converting a protocol that is used for communication with the host computer 1000 or the external physical storage systems, such as FC, Fibre Channel over Ethernet (FCoE), or iSCSI, into a protocol that is used within the storage controller, for example, PCIe.

The management interface 2800 is a device for coupling to the LAN 5000. The management interface 2800 has a function of converting a protocol that is used in the LAN 5000 into a protocol that is used within the storage controller, for example, PCIe.

The CPU 2100 executes a program for storage system control, to thereby implement given functions including the control of I/O to and from the host computer 1000, and the management and control of volumes of the physical storage system 2000. At least some of functions that are described in this embodiment as functions realized by the CPU 2100 may be realized by a logic circuit that is not the CPU 2100.

The program memory 2300 stores data and a program that are handled by the CPU 2100. The data of the program memory 2300 is loaded in the program memory 2300 from, for example, one of the storage devices 2200, or a flash memory (not shown), within the physical storage system 2000, or from other apparatus coupled via the LAN 5000.

Figure 4:
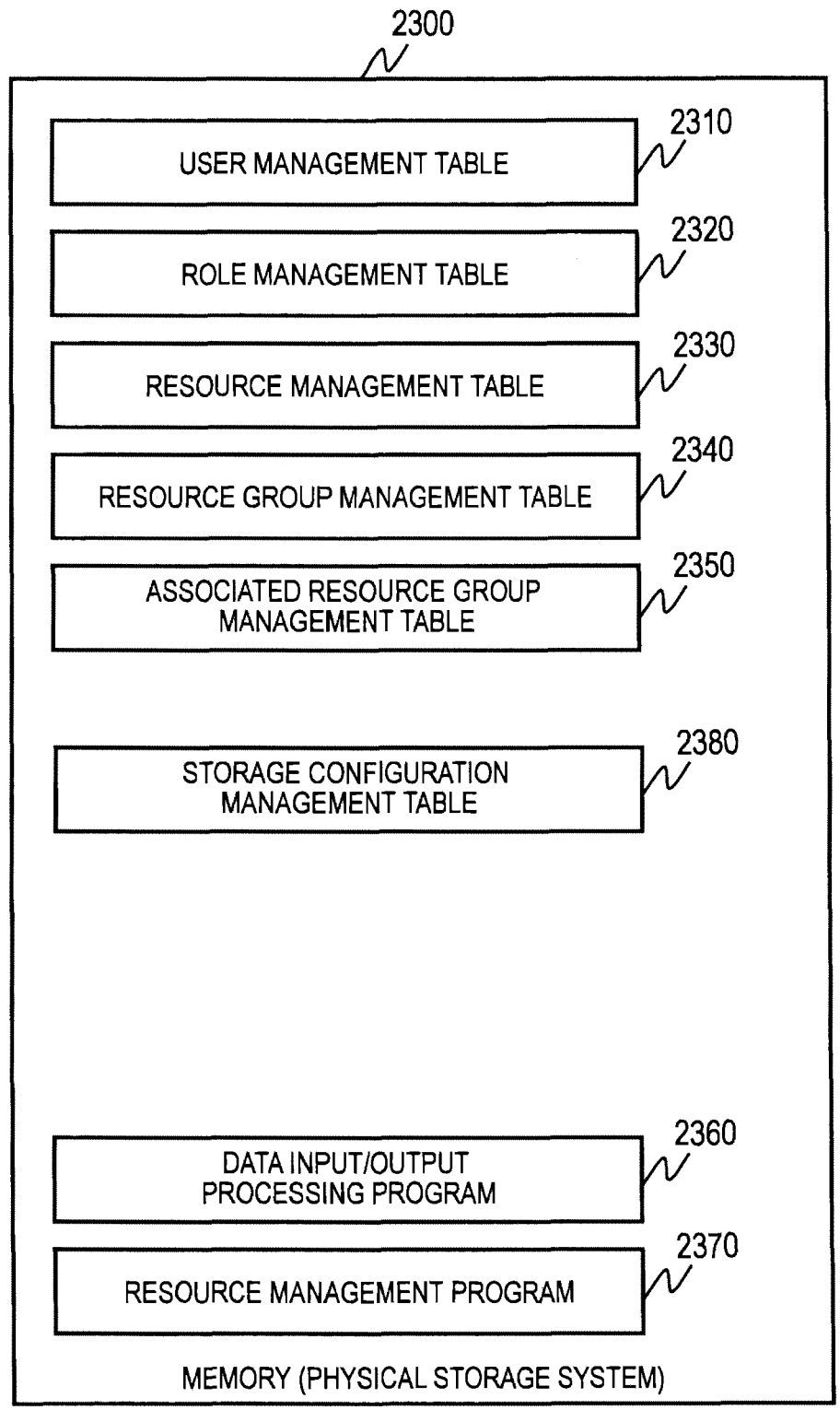
FIG. 4 is a diagram illustrating an example of the software configuration in a memory of the physical storage system in the first embodiment.

FIG. 4 illustrates an example of software configuration in the program memory 2300 of the physical storage system 2000. The program memory 2300 holds a data input/output processing program 2360 and a resource management program 2370. The program memory 2300 also holds a user management table 2310, a role management table 2320, a resource management table 2330, a resource group management table 2340, an associated resource group management table 2350, and a storage configuration management table 2380.

The data input/output processing program 2360 reads and writes user data in accordance with I/O requests from the host computer 1000, and performs necessary data communication with the host computer 1000 and other storage systems.

The resource management program 2370 manages resources of the physical storage system 2000. The resource management program 2370 creates and removes a volume and, in addition, creates and updates tables (information) described below. The resource management program 2370 exchanges information necessary for resource management with the management computer 3000.

The tables (information) held in the physical storage system 2000 are described below. Described below is a configuration example of tables referred to in the description of this embodiment. Tables of the same name have the same configuration (columns) in each physical storage system 2000.

FIG. 5 illustrates a configuration example of the user management table 2310 that is held, prior to resource migration, in the program memory 2300 included in the migration source physical storage system 2000A. The user management table 2310 is a table for managing users (administrators) of the migration source physical storage system 2000A.

The user management table 2310 includes a user ID column 2311 for storing an administrator account (user identifier) of the physical storage system 2000A, a password column 2312 for storing a password that is used to determine for each user whether to grant access to the user, and a UGID column 2313 for storing, for each user, the ID of a user group to which the user belongs.

In the computer system of this example, each user belongs to one of user groups. One or more user groups are defined for the physical storage system 2000A. One user group is constituted of one user or a plurality of users. Users may be managed on a user-by-user basis without defining user groups.

FIG. 6 illustrates a configuration example of the role management table 2320 that is held, prior to resource migration, in the program memory 2300 included in the migration source physical storage system 2000A. The role management table 2320 is a table for managing management permissions that are allocated to users in the migration source physical storage system 2000A.

The role management table 2320 is used to manage (defines) permissions of roles allocated to users. The role management table 2320 includes a role ID column 2321 for storing the identifier of a role that is assigned to a user (administrator) of the computer system, and a permission column 2322 indicating, for each role, a permission that is allocated to the role.

In the example of FIG. 6, a permission "view" is assigned to Role1 and a permission "view/modify" is assigned to Role2. A user who is Role1 is only allowed to view resource information, user information and the like in the storage system, and a user who is Role2 is allowed to perform a resource setting operation, a user management operation and the like in addition to viewing the resource information, user information and the like. For instance, the user who is Role2 can create a volume, allocate a parity group (RAID group) to a volume, set a path between a volume and a port, remove a volume, create a copy pair, create a user account, define a user group, allocate a role to a user group and the like.

For the migration source physical storage system 2000A, two types of permissions are defined in this example but three or more permissions may be defined. For instance, a permission regarding user management, such as defining a user account, defining a user group and allocating a role to a user group, may be defined aside from the permissions "view" and "view/modify". A plurality of permissions "view" and a plurality of permissions "view/modify" may be defined depending on which target can be viewed and which target can be modified.

FIG. 7 illustrates a configuration example of the resource management table 2330 that is held, prior to resource migration, in the program memory 2300 included in the migration source physical storage system 2000A. The resource management table 2330 is a table for managing resources in the physical storage system 2000A.

The resource management table 2330 includes a resource type column 2331, a resource ID column 2332, and an RSGID column 2333 indicating a resource group to which a resource belongs. The resource ID column 2332 stores the identifier of each resource. The resource type column 2331 stores, for each resource ID, an identifier for identifying the type of a resource that is identified by the resource ID. The RSGID column 2333 stores, for each resource ID, the identifier of a resource group to which a resource identified by the resource ID belongs.

In this example, resources of the migration source storage system 2000A are divided into one resource group or a plurality of resource groups. A resource group is constituted of one resource or a plurality of resources. Defining resource groups helps to manage resources efficiently. For example, one resource belongs to one resource group and does not belong to any other resource groups.

In the example of FIG. 7, four types of resources, ports (physical ports), host groups, volumes, and parity groups (RAID groups), are defined. As described later with reference to FIG. 10A, a host group is a group defined in a physical storage system, and is a group of host computers that are coupled to the same physical port and run on the same platform. A host computer registered to a host group accesses a volume that is allocated to the host group.

For each host group, one resource or a plurality of resources (ports or volumes) are defined in the physical storage system 2000A to be allocated to the host group. The one resource or plurality of resources allocated are identified by resource IDs of the host group. Host computers and resources allocated to the host computers may be managed without defining host groups.

The types of resources defined in the resource management table 2330 depend on the design, and only some of the types of resources given above may be defined. Resources of different types from the types given above, for example, cache memories, may be managed in the resource management table 2330.

Figure 8:
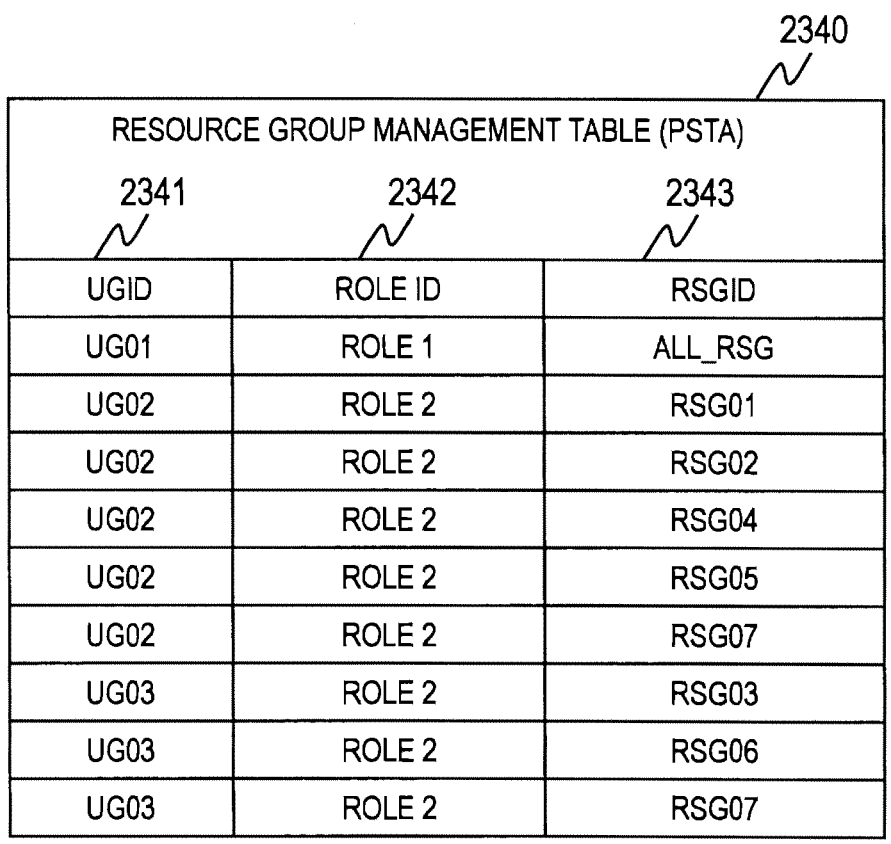
FIG. 8 is a diagram illustrating a configuration example of a resource group management table in the migration source physical storage system in the first embodiment.

FIG. 8 illustrates a configuration example of the resource group management table 2340 that is held, prior to resource migration, in the program memory 2300 of the migration source physical storage system 2000A. The resource group management table 2340 is a table for managing resource groups in the physical storage system 2000A.

The resource group management table 2340 includes a UGID column 2341 for storing a user group ID, a role ID column 2342 for storing the ID of a role that is assigned to a user group, and an RSGID column 2343 for storing a resource group that is allocated to a user group. One resource group or a plurality of resource groups are allocated to one user group, and a role of a user group is defined for each allocated resource group.

A user can manage (view or modify) each resource of a resource group allocated to a user group to which the user belongs, within the permission of a role defined for the resource group. For example, each user in a user group UG02 can view and modify (Role2) each of resource groups RSG01, RSG02, RSG04, RSG05, and RSG07. By defining permissions on a resource group-by-resource group basis in this manner, efficient management is accomplished.

FIG. 9 illustrates a configuration example of the associated resource group management table 2350 that is held, prior to resource migration, in the program memory 2300 of the migration source physical storage system 2000A. The associated resource group management table 2350 defines migration target resource groups that are associated with each other.

The associated resource group management table 2350 includes an RSGID column 2351 indicating a migration target resource group and an associated RSGID column 2352 indicating, for each migration target resource group, the identifier of a resource group that is associated with the migration target resource group in terms of storage configuration (resource configuration).

Resources that are associated with each other in terms of configuration are, for example, a physical port (RSG01) and a volume (RSG04) between which a path is set, or a volume (RSG06) and a host group (RSG03) to which the volume is allocated. Relations that are defined as associated depend on the design. For instance, a volume and a parity group that provides a storage area to the volume may be defined as associated resources in the associated resource group management table 2350.

When one of resources included in one resource group and one of resources included in another resource group are associated with each other, these resource groups are defined as associated. As described later, migration target resource groups that are associated with each other are migrated to the same physical storage system.

FIGS. 10A to 10D illustrate a configuration example of the storage configuration management table 2380 that is held, prior to resource migration, in the program memory 2300 included in the migration source physical storage system 2000A. The storage configuration management table 2380 includes a host group management table 2381A, a volume management table 2382A, a parity group management table 2383A, and a virtual storage table 2384.

FIG. 10A illustrates a configuration example of the host group management table 2381A. The host group management table 2381A is a table for managing resources that are allocated to host groups.

The host group management table 2381A includes a host group ID column 2381Aa, a port ID column 2381Ab, a host WWN column 2381Ac, and a volume ID column 2381Ad. The host group management table 2381A defines, for each host computer, a host group to which the host computer belongs and a physical port and a volume that are allocated to the host computer.

The host WWN column 2381Ac stores the World Wide Name (WWN) of a host computer (interface). In this example, the WWN of one host computer is registered in conformity to the system configuration of FIG. 1. The host group ID column 2381Aa stores, for each host computer, the identifier of a host group to which the host computer belongs.

The port ID column 23381Ab and the volume ID column 2381Ad respectively store a physical port identifier and a volume identifier of a physical port and a volume that are allocated to a host group. A path is set between a physical port and a volume that are in the same entry.

FIG. 10B illustrates a configuration example of the volume management table 2382A. The volume management table 2382A is a table for managing volumes that are provided by the physical storage system 2000A.

The volume management table 2382A includes a volume ID column 2382Ac for storing the identifier of a volume, a PGID column 2382Ab for storing the identifier of a parity group, and a capacity column 2382Ac. The PGID column 2382Ab indicates, for each volume, a parity group that provides a storage area to the volume. The capacity column 2382Ac indicates the capacity of each volume.

FIG. 10C illustrates a configuration example of the parity group management table 2383A. The parity group management table 2383A is a table for managing parity groups of the physical storage system 2000A. In this example, only one parity group is defined but the physical storage system 2000A can include a plurality of parity groups.

The parity group management table 2383A in the example of FIG. 10C includes a PGID column 2383Aa for storing the identifier of a parity group, a total capacity column 2383Ab, and a free capacity column 2383Ac. As illustrated in FIG. 10B, the total capacity of volumes VOL01 to VOL07 is 650 GB, and 350 GB out of the total capacity of a parity group PG01, 1000 GB, is free capacity.

FIG. 10D illustrates a configuration example of the virtual storage table 2384. The virtual storage table 2384 stores configuration information of a migration destination virtual storage system 6000. The virtual storage table 2384 includes a virtual storage system ID column 2384*a* and a physical storage system ID column 2384*b*. The physical storage system ID column 2384*b* stores the identifier of a physical storage system included in a virtual storage system.

In this example, the migration destination is one virtual storage system VST1, which is constituted of two physical storage systems PSTB and PSTC. The management computer 3000 and the migration source physical storage system 2000A can identify virtual storage systems and physical storage systems that are included as migration destinations by referring to the virtual storage table 2384.

FIGS. 11A to 11C illustrate a configuration example of the storage configuration management table 2380 that is held, prior to resource migration, in the program memory 2300 included in the physical storage system 2000B in the migration destination virtual environment. The storage configuration management table 2380 includes a host group management table 2381B, a volume management table 2382B, and a parity group management table 2383B.

The host group management table 2381B of FIG. 11A includes a host group ID column 2381Ba, a port ID column 2381Bb, a host WWN column 2381Bc, and a volume ID column 2381Bd. This table configuration is the same as that of the host group management table 2381A described above.

The volume management table 2382B of FIG. 11B includes a volume ID column 2382Ba, a PGID column 2382Bb, and a capacity column 2382Bc. This table configuration is the same as that of the volume management table 2382A described above. The parity group management table 2383B of FIG. 11C includes a PGID column 2383Ba, a total capacity column 2383Bb, and a free capacity column 2383Bc. This table configuration is the same as that of the parity group management table 2383A described above.

Figure 12B:
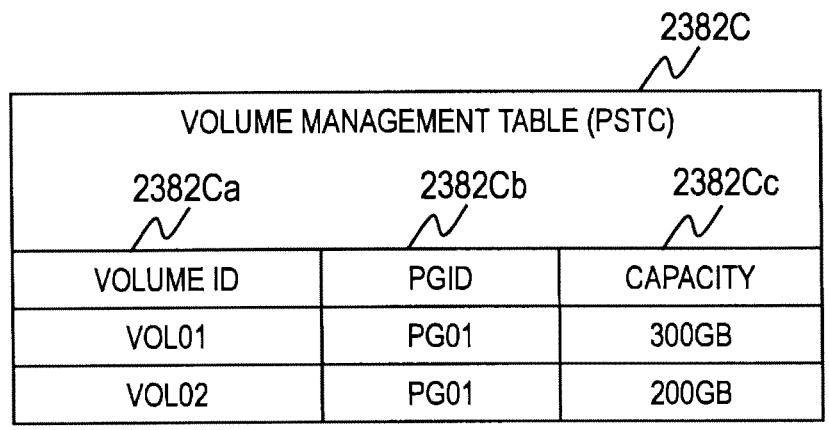
FIG. 12B is a diagram illustrating a configuration example of a volume management table in the migration destination candidate physical storage system C in the first embodiment.
Figure 12C:
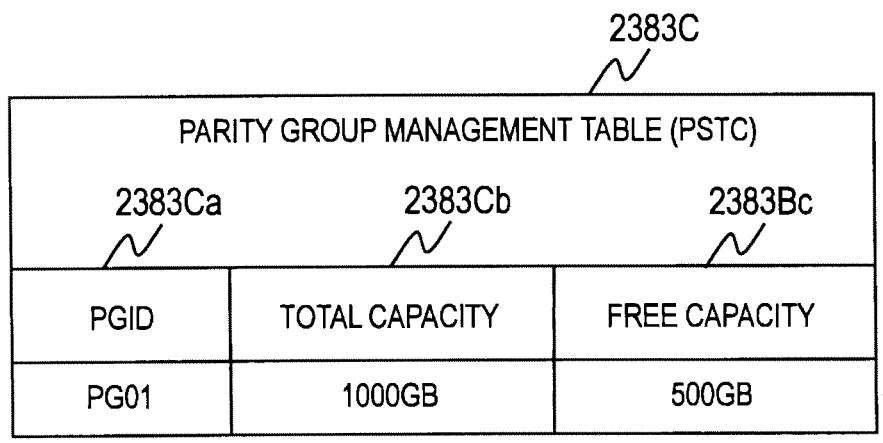
FIG. 12C is a diagram illustrating a configuration example of a parity group management table in the migration destination candidate physical storage system C in the first embodiment.

FIGS. 12A to 12C illustrate a configuration example of the storage configuration management table 2380 that is held, prior to resource migration, in the program memory 2300 included in the physical storage system 2000C in the migration destination virtual environment. The storage configuration management table 2380 includes a host group management table 2381C, a volume management table 2382C, and a parity group management table 2383C.

The host group management table 2381C of FIG. 12A includes a host group ID column 2381Ca, a port ID column 2381Cb, a host WWN column 2381Cc, and a volume ID column 2381Cd. This table configuration is the same as that of the host group management table 2381A described above.

The volume management table 2382C of FIG. 12B includes a volume ID column 2382Ca, a PGID column 2382Cb, and a capacity column 2382Cc. This table configuration is the same as that of the volume management table 2382A described above. The parity group management table 2383C of FIG. 12C includes a PGID column 2383Ca, a total capacity column 2383Cb, and a free capacity column 2383Cc. This table configuration is the same as that of the parity group management table 2383A described above.

Figure 13:
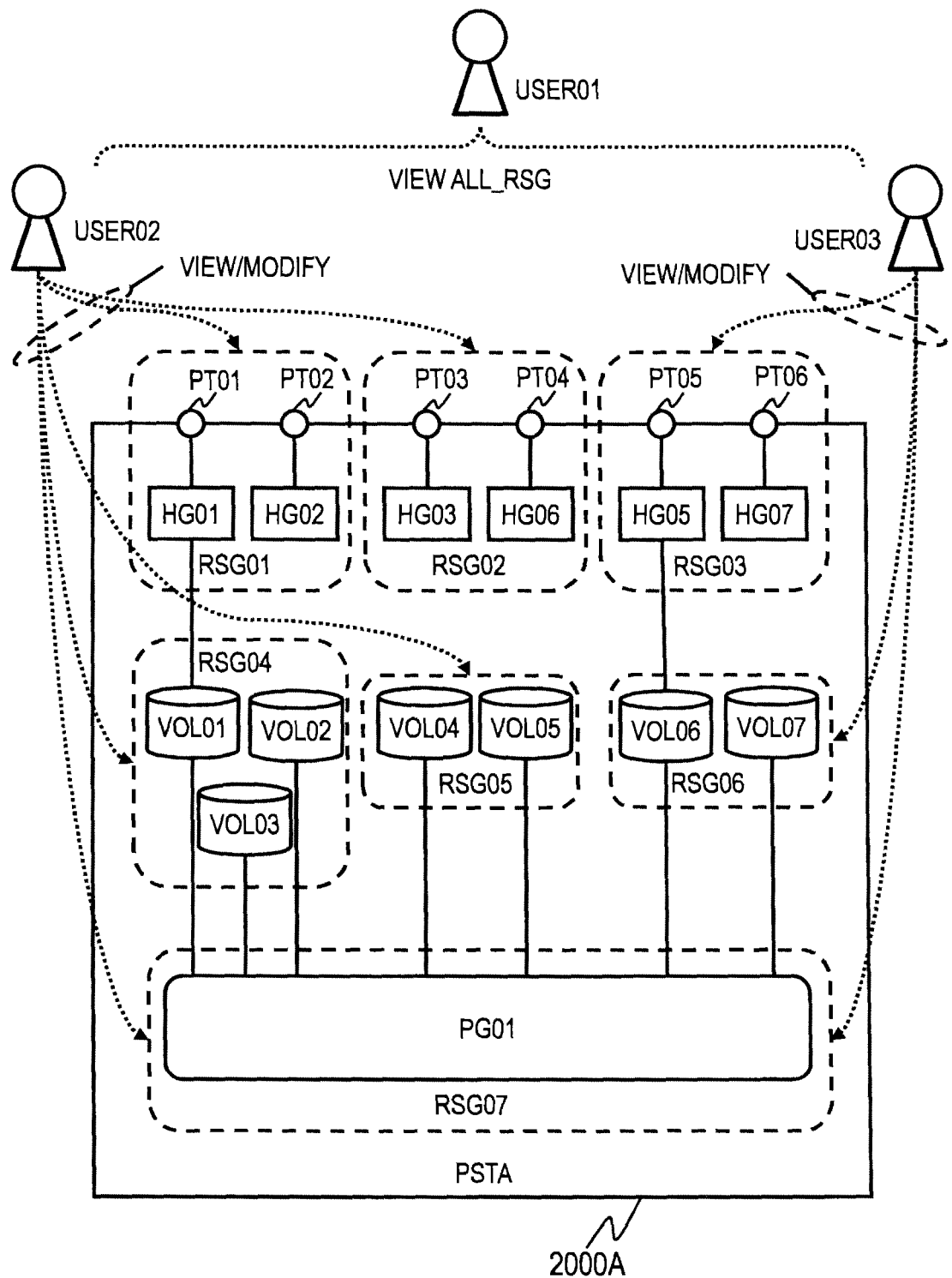
FIG. 13 is a diagram illustrating an example of resource configuration in the migration source physical storage system in the first embodiment.

FIG. 13 is a diagram schematically illustrating a configuration example of the migration source physical storage system 2000A prior to the resource migration. The configuration example of FIG. 13 corresponds to the configuration examples that have been described with reference to FIGS. 5 to 10C. The migration source physical storage system 2000A includes six physical ports, PT01 to PT06, which are allocated to host groups HG01 to HG06, respectively.

The physical ports PT01 and PT02 and the host groups HG01 and HG02 form a resource group RSG01. The physical ports PT03 and PT04 and the host groups HG03 and HG04 form a resource group RSG02. The physical ports PT05 and PT06 and the host groups HG05 and HG06 form a resource group RSG03.

A resource group RSG04 is constituted of volumes VOL01 to VOL03. The volume VOL01 is allocated to the host group HG01, and a path is set between the volume VOL01 and the physical port PT01, which are associated with each other. As a result, the resource group RSG04 and the resource group RSG01 are associated with each other.

A resource group RSG05 is constituted of volumes VOL04 and VOL05. A resource group RSG06 is constituted of volumes VOL06 and VOL07. The volume VOL06 is allocated to the host group HG05, and a path is set between the volume VOL06 and the physical port PT05, which are associated with each other. As a result, the resource group RSG06 and the resource group RSG03 are associated with each other.

The volumes VOL01 to VOL07 are constituted of storage areas provided by a parity group PG01. The parity group PG01 forms a resource group RSG07.

A user User01 is allowed to view information of all resource groups (resources). The user User01 does not have a permission for modifying resources, and therefore cannot create, change, and remove any resources. A user User02 has permissions for viewing and modifying the resource groups RSG01, RSG02, RSG04, RSG05, and RSG07. A user User03 has permissions for viewing and modifying the resource groups RSG03, RSG06, and RSG07.

Figure 14:
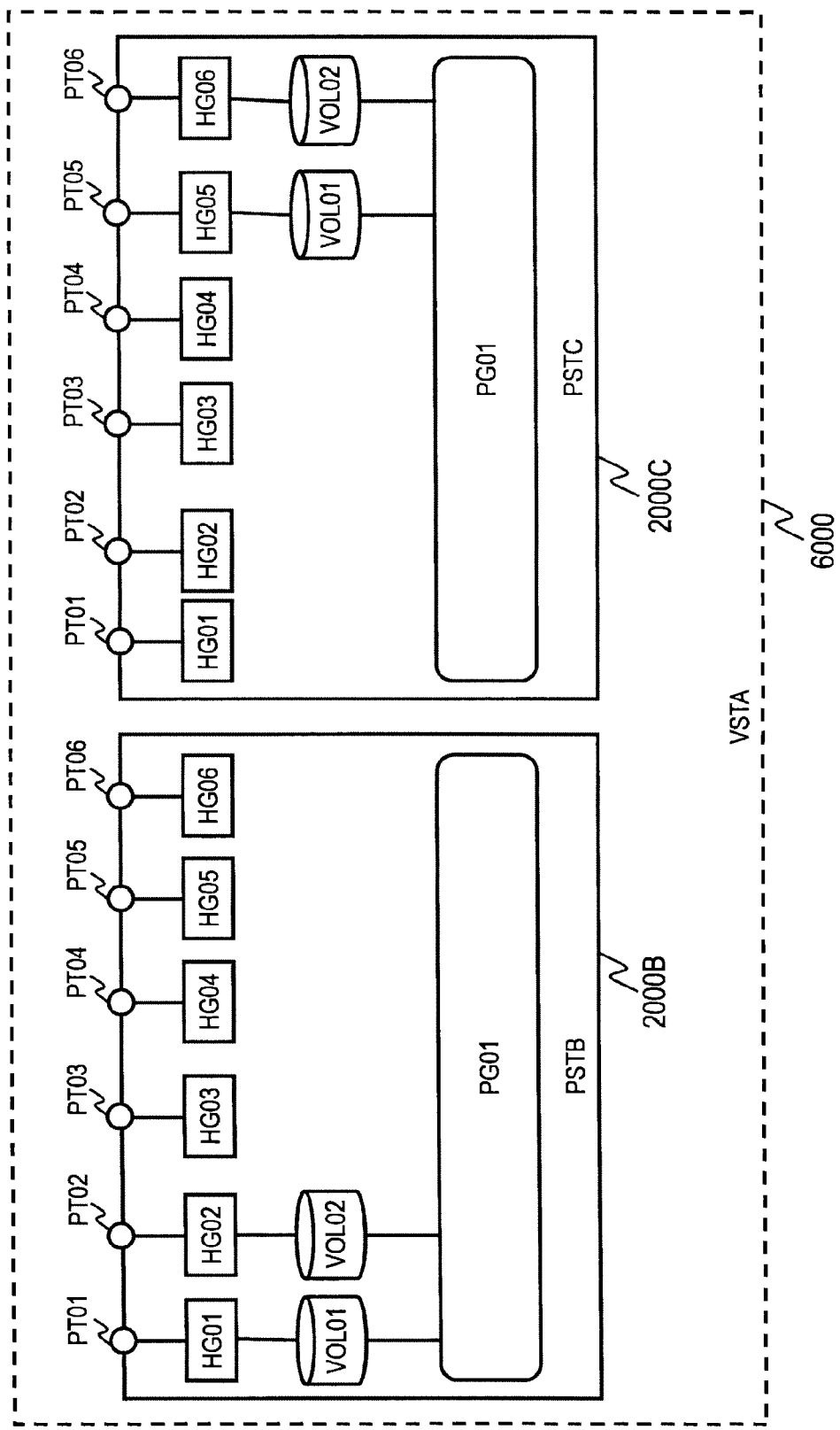
FIG. 14 is a diagram illustrating an example of resource configuration in a migration destination virtual storage system prior to resource migration in the first embodiment.

FIG. 14 illustrates a configuration example of the migration destination candidate physical storage systems 2000B and 2000C included in the migration destination virtual storage system 6000 prior to resource migration. The configuration example of FIG. 14 corresponds to the configurations described with reference to FIGS. 11A to 12C.

The physical storage system 2000B includes physical ports PT01 to PT06, host groups HG01 to HG06 to which the physical ports PT01 to PT06 are allocated, volumes VOL01 and VOL02, and a parity group PG01.

The volumes VOL01 and VOL02 are allocated to the host groups HG01 and HG02, respectively. A path is set between the volume VOL01 and the physical port PT01, and a path is set between the volume VOL02 and the physical port PT02. The parity group PG01 provides storage areas to the volumes VOL01 and VOL02.

The physical storage system 2000C includes physical ports PT01 to PT06, host groups HG01 to HG06 to which the physical ports PT01 to PT06 are allocated, volumes VOL01 and VOL02, and a parity group PG01. The volumes VOL01 and VOL02 are allocated to the host groups HG05 and HG06, respectively. A path is set between the volume VOL01 and the physical port PT05, and a path is set between the volume VOL02 and the physical port PT06. The parity group PG01 provides storage areas to the volumes VOL01 and VOL02.

Figure 15:
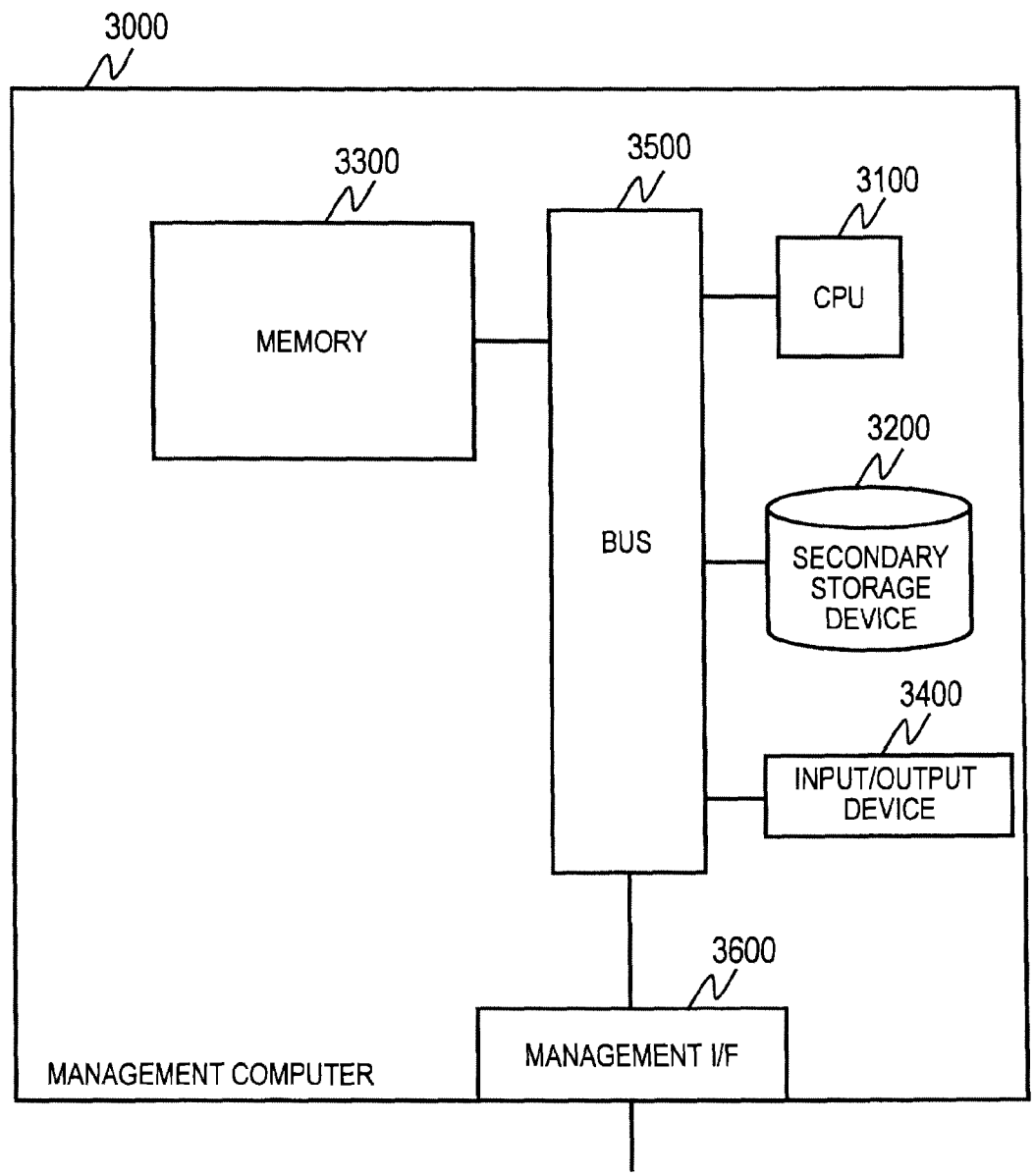
FIG. 15 is a diagram illustrating a configuration example of a management computer in the first embodiment.

FIG. 15 is a diagram illustrating a configuration example of the management computer 3000. The management computer 3000 includes a CPU 3100, which is a processor, a memory 3300, which is the main storage device, a secondary storage device 3200, an input/output device 3400, and a management interface (I/F) 3600. The devices of the management computer 3000 are connected by a bus 3500 in a manner that allows communication with one another.

The management computer 3000 executes a management program and operates as programmed by the management program. The management I/F 3600 couples to the LAN 5000 and performs conversion between a protocol within the computer and a protocol of the LAN 5000. The management computer 3000 can communicate with the physical storage systems 2000A to 2000C and the host computer 1000 via the management I/F 3600 and the LAN 5000.

The input/output device 3400 includes one device or a plurality of devices which are selected from a display, a pointer, a keyboard, and the like. With the input/output device 3400, users (the users User01 to User03 in the above example) can operate the management computer 3000 and may also access the management computer 3000 from a client computer that is coupled via a network. The client computer is included in a management system along with the management computer 3000. A user inputs necessary information with the input device (for example, a mouse and a keyboard) and views necessary information with the output device.

The CPU 3100 executes a program stored in the memory 3300 to implement given functions of the management computer 3000. The memory 3300 stores a program executed by the CPU 3100, and data necessary for the execution of the program. Programs running on the management computer 3000 are described later. At least some of functions that are described in this embodiment as functions realized by the CPU 3100 may be realized by a logic circuit that is not the CPU 3100.

For example, a program is loaded onto the memory 3300 from the secondary storage device 3200. The secondary storage device 3200 is storage that includes a non-volatile, non-transient storage medium for storing a program and data that are necessary to implement given functions of the management computer 3000. The secondary storage device 3200 may be external storage coupled via a network.

The management system of this configuration example is constituted of a management computer. Alternatively, the management system may be constituted of a plurality of computers. One of the plurality of computers may be a display-use computer, and the plurality of computers may implement processing equivalent to that of a management computer in order to enhance the speed and reliability of management processing.

For instance, an administrator may access, from a management console of the management computer, the management computer of this management system to instruct the management computer to execute processing, and to have the management console obtain and display results of the processing of the management computer. The management system may be built inside a physical storage system. Some of functions of the management system may be implemented in a physical storage system.

Figure 16:
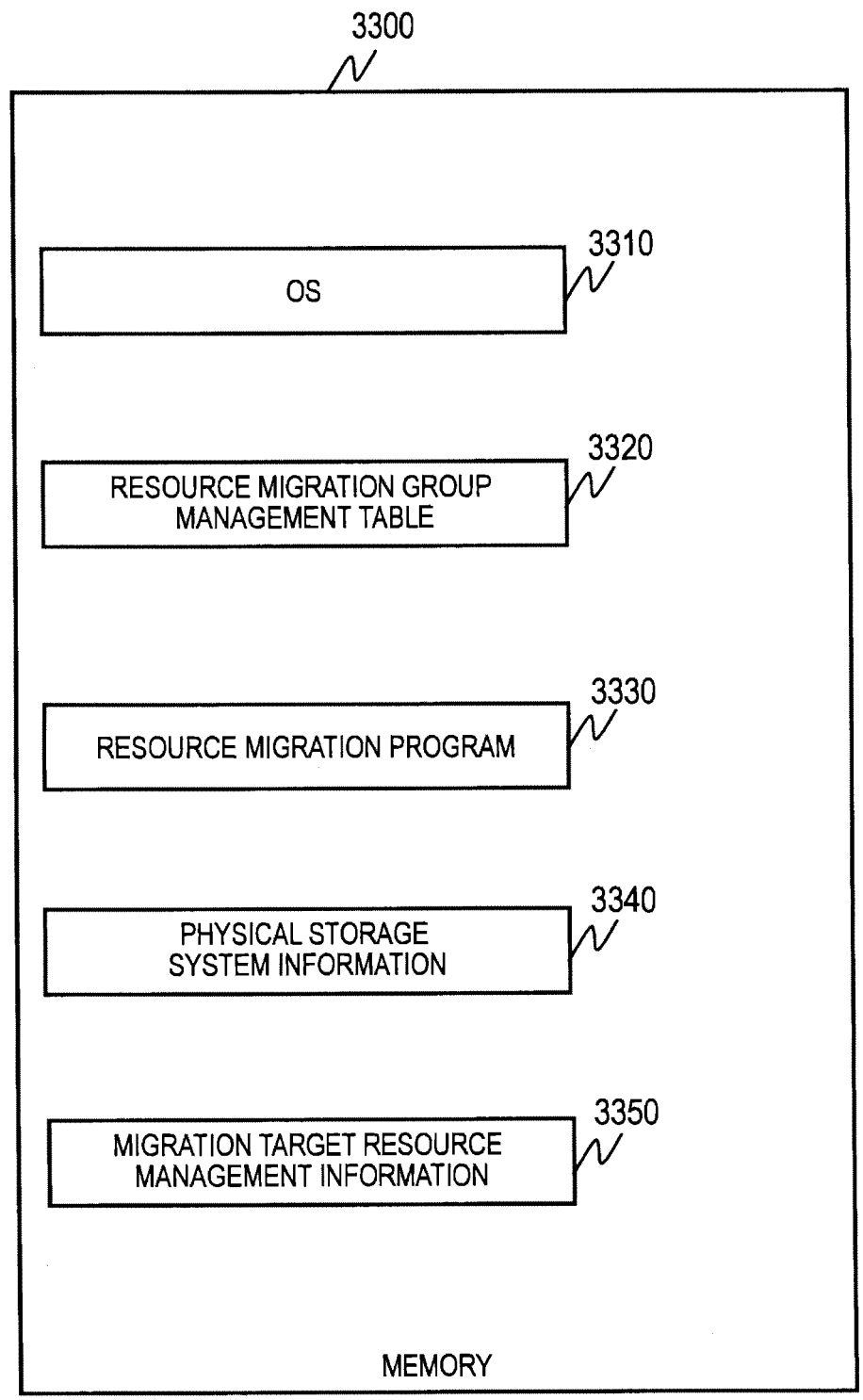
FIG. 16 is a diagram illustrating a software configuration in a memory of the management computer in the first embodiment.

FIG. 16 illustrates an example of software configuration in the memory 3300 of the management computer 3000. The memory 3300 holds an OS 3310, a resource migration group management table 3320, a resource migration program 3330, physical storage system information 3340, and migration target resource information 3350. The resource migration program 3330 is included in the management program.

The resource migration program 3330 determines a migration destination physical storage system for a migration target resource in the migration source physical storage system 2000A, and creates the resource migration group management table 3320. Migration destination candidate physical storage systems in the configuration example of FIG. 1 are the physical storage systems 2000B and 2000C. The resource migration program 3330 selects any one of these candidates as the migration destination of the resource, or determines that the resource can be migrated to neither of these candidates.

The physical storage system information 3340 includes information about the physical storage systems 2000A to 2000C that is necessary to determine the migration destination of a migration target resource, specifically, the configuration information of resources and management permission information. The management computer 3000 can obtain the information from the physical storage systems 2000A to 2000C. The management computer 3000 may create the physical storage system information 3340 from information that is input from the input/output device 3400 or another management computer.

The migration target resource information 3350 indicates a resource selected as a migration target resource in the migration source physical storage system 2000A. For example, the management computer 3000 obtains the migration target resource information 3350 from the input/output device 3400 or the migration source physical storage system 2000A. The migration target resource information 3350 includes, for example, the identifier of a migration target resource group.

FIGS. 17A and 17B and FIGS. 18A and 18B illustrate configuration examples of the resource migration group management table 3320. A migration group is a group of resources in the migration source physical storage system 2000A to be migrated to a single physical storage system. In this example, the resource migration program 3330 determines a migration group based on users' management permissions with respect to resources.

This reduces the occurrence of communication between storage systems at the migration destination when a resource is migrated from the migration source physical storage system 2000A to a virtual storage environment that includes a plurality of physical storage systems, 2000B and 2000C, and thereby reduces the possibility of deterioration in host I/O performance.

The resource migration group management table 3320 is used to manage the configuration of each migration group and a physical storage system that is the migration destination of the migration group. Resource migration from the migration source physical storage system 2000A to the virtual storage system 6000 is executed in accordance with the resource migration group management table 3320.

In this example, migration target resources selected in the migration source physical storage system 2000A are resources included in the resource groups RSG01 to RSG06. Migration target resources, in this example, migration target resource groups, are specified by users in advance and stored in the migration target resource management information 3350.

FIGS. 17A and 17B illustrate an example of the contents of the resource migration group management table 3320 immediately after the completion of migration group migration destination determining processing S107 in processing of the resource migration program 3330 which is described later with reference to FIGS. 19A to 19D. On the other hand, FIGS. 18A and 18B illustrate an example of the contents of the resource migration group management table 3320 immediately after the completion of migration group migration destination redefining processing S109 in processing of the resource migration program 3330 which is described later with reference to FIGS. 19A to 19D.

The resource migration group management table 3320 includes a resource migration group management table A 3321, which is illustrated in FIGS. 17A and 18A, and a resource migration group management table B 3322, which is illustrated in FIGS. 17B and 18B.

In FIGS. 17A and 18A, the resource migration group management table A 3321 includes a migration group ID column 3321a for storing the identifier of a migration group, an RSGID column 3321b for storing the identifier of a resource group that belongs to a migration group, and a migration destination storage ID column 3321c for storing the identifier of migration destination storage of a migration group. The resource migration group management table A 3321 thus defines, for each migration group, a resource group belonging to the migration group and a migration destination (candidate) physical storage system of the migration group.

In FIGS. 17B and 18B, the resource migration group management table B 3322 is used to manage the total port count and total volume capacity of each migration group. The resource migration group management table B 3322 includes a migration group ID column 3322a for storing the identifier of a migration group, a port count column 3322b indicating, for each migration group, the total count of ports within all resource groups that belong to the migration group, and a volume capacity 3322c indicating, for each migration group, the total capacity of volumes within all resource groups that belong to the migration group.

FIGS. 19A to 19D are flowcharts illustrating an example of processing that is executed by the resource migration program 3330 in the management computer 3000. As described above, the resource migration program 3330 determines a migration destination for a migration target resource in the migration source physical storage system 2000A. This processing is described with reference to the flowcharts of FIGS. 19A to 19D.

In Step S101, the resource migration program 3330 first obtains configuration information of all physical storage systems including the migration source physical storage system 2000A and the migration destination candidate physical storage systems 2000B and 2000C, and users' management permission information. The obtained information is stored in the memory 3300 as the physical storage system information 3340.

Specifically, the resource migration program 3330 obtains, from each physical storage system 2000, information of the user management table 2310, the role management table 2320, the resource management table 2330, the resource group management table 2340, the associated resource group management table 2350, and the storage configuration management table 2380.

The resource migration program 3330 may obtain the entire information of each table, or may obtain only necessary information of each table. For example, the resource migration program 3330 may not obtain from the migration source physical storage system 2000A the parity group management table 2383B and parity group-related information of the resource management table 2330.

Next, in Steps S102 to S104, the resource migration program 3330 executes processing of Step S103 for each of the migration destination physical storage systems 2000B and 2000C.

In Step S103, the resource migration program 3330 compares the resource count and capacity of each resource type of a migration target in the migration source physical storage system 2000A against the count of unused resources and free capacity of each resource type of the migration destination candidate physical storage systems 2000B and 2000C. The resource migration program 3330 thus determines whether or not all migration target resources can be migrated to a single migration destination candidate physical storage system.

For instance, from information of the resource management table 2330 of the migration source physical storage system 2000A, the resource migration program 3330 can identify resources that are included in a migration target resource group, and can find out the count of migration target resources, for example, the count of physical ports or volumes. The resource migration program 3330 can also find out the capacity of volumes to be migrated by referring to the volume management table 2382A.

The resource migration program 3330 refers to host group management tables 2381B and 2381C to find out the free physical port counts of the respective migration destination candidate physical storage systems 2000B and 2000C, and refers to the parity group management tables 2383B and 2383C to find out the free capacities of the respective migration destination candidate physical storage systems 2000B and 2000C.

The order in which the resource migration program 3330 selects migration destination candidate physical storage systems as targets for comparison of the count of unused resources and free capacity of each resource type between the migration source physical storage system 2000A and the migration destination candidate physical storage systems 2000B and 2000C, in other word, the migration destination candidate physical storage system selected first from the migration destination candidate physical storage systems 2000B and 2000C for Step S103 may be determined based on the information regarding the count of unused resources and free capacity of each resource type of the migration destination candidate physical storage systems 2000B and 2000C. For instance, when considering the capacity balancing in the whole migration destination environment, Step S103 is performed in order of free capacity from the migration destination candidate physical storage system with the largest free capacity. Alternatively, the migration destination candidate physical storage system with the greatest number of free physical ports may be selected first, or the migration destination candidate physical storage system with the largest free capacity and the greatest number of free physical ports.

When the result of the determination in Step S103 is positive (S103: yes), in other words, when all migration target resources of the migration source physical storage system 2000A can be migrated to one physical storage system selected from the migration destination candidate physical storage systems 2000B and 2000C, the resource migration program 3330 determines to migrate all the migration target resources to the one selected physical storage system, and outputs an image indicating the determination to the input/output device 3400. The input/output device 3400 presents, to the user, information indicating the migration target resources and a physical storage system that is the migration destination of the migration target resources. Migrating all migration target resources to a single physical storage system ensures even more that the deterioration of host I/O performance at the migration destination is prevented.

When the result of the determination in Step S103 is negative (S103: no), in other words, when all migration target resources of the migration source physical storage system 2000A cannot be migrated to a single physical storage system, the resource migration program 3330 proceeds to Step S106.

In Step S106, the resource migration program 3330 executes processing of determining a migration group (migration group defining processing). A migration group is the unit of resource migration to a plurality of migration destination candidate physical storage systems, 2000B and 2000C. A migration group is a group of resources to be migrated to a single physical storage system.

The resource migration program 3330 creates the migration group management table A 3321 and the migration group management table B 3322 in Step S106. The migration destination storage ID column 3321c in the migration group management table A 3321 stores only a value null. Details of the migration group defining processing S106 are described later.

In Step S107, the resource migration program 3330 determines, for each migration group determined in Step S106, to which migration destination candidate physical storage system the migration group is to be migrated. When a migration destination is determined for the migration group, the ID of this migration destination physical storage system is stored in the migration group management table A 3321.

In the case where one of the migration groups can be migrated to neither of the migration destination candidate physical storage systems 2000B and 2000C, the resource migration program 3330 returns a value indicating this fact. In the case where every migration group can be migrated to either of the migration destination candidate physical storage systems 2000B and 2000C, the resource migration program 3330 returns a value indicating this fact.

In Step S108, the resource migration program 3330 refers to the return value of Step S107 to determine whether or not every migration group can be migrated to either of the migration destination candidate physical storage systems 2000B and 2000C. Details of Step S107 are described later.

When the result of the determination in Step S108 is positive (S108: yes), in other words, when every migration group can be migrated to either of the migration destination candidate physical storage systems 2000B and 2000C, the resource migration program 3330 establishes, for each resource group (resource), the relation between the resource group and a migration destination physical storage system that has been determined in Step S107, and outputs an image indicating this fact to the input/output device 3400. For example, the input/output device 3400 presents to the user the migration group management table 3320 which is the results of Step S107.

When the result of the determination in Step S108 is negative (S108: no), in other words, when one of the migration groups can be migrated to neither of the migration destination candidate physical storage systems 2000B and 2000C, the resource migration program 3330 executes migration group redefining processing (S109).

The resource migration program 3330 redefines migration groups for resources of a migration group for which a migration destination physical storage system has not been determined. This reduces the possibility of abnormal end that is caused by a failure to determine a migration destination for a migration group. Details of Step S109 are described later. This redefining processing may be omitted.

In Step S110, the resource migration program 3330 performs the same processing as Step S107 on the migration group for which a migration destination has not been determined, and proceeds to Step S111. In the case where every migration group can be migrated to either of the migration destination candidate physical storage systems 2000B and 2000C (S111: yes), the resource migration program 3330 outputs this result to the input/output device 3400. For example, the resource migration program 3330 outputs image data containing the tables of FIGS. 18A and 18B to the input/output device 3400, which presents the image data to the user.

In the case where one of the migration groups can be migrated to neither of the migration destination candidate physical storage systems 2000B and 2000C (S111: no), the resource migration program 3330 brings this flow to an abnormal end, and notifies the user via the input/output device 3400 of the failure to determine an appropriate migration destination. For example, the resource migration program 3330 presents to the user the migration group management table 3320 that contains a value null as the results of Step S110.

Figure 19A:
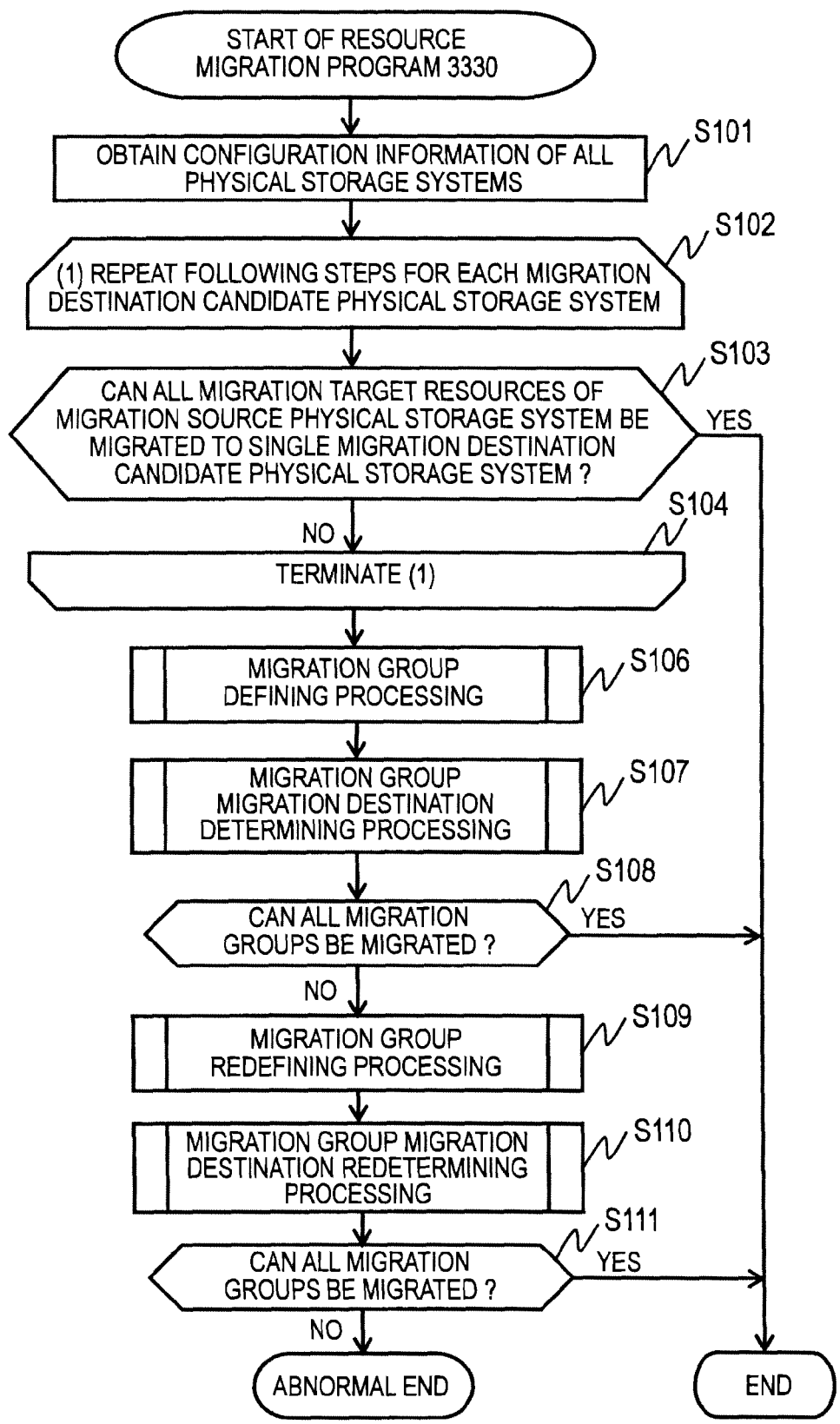
FIG. 19A is a flowchart illustrating an example of processing of a resource migration program in the first embodiment.
Figure 19B:
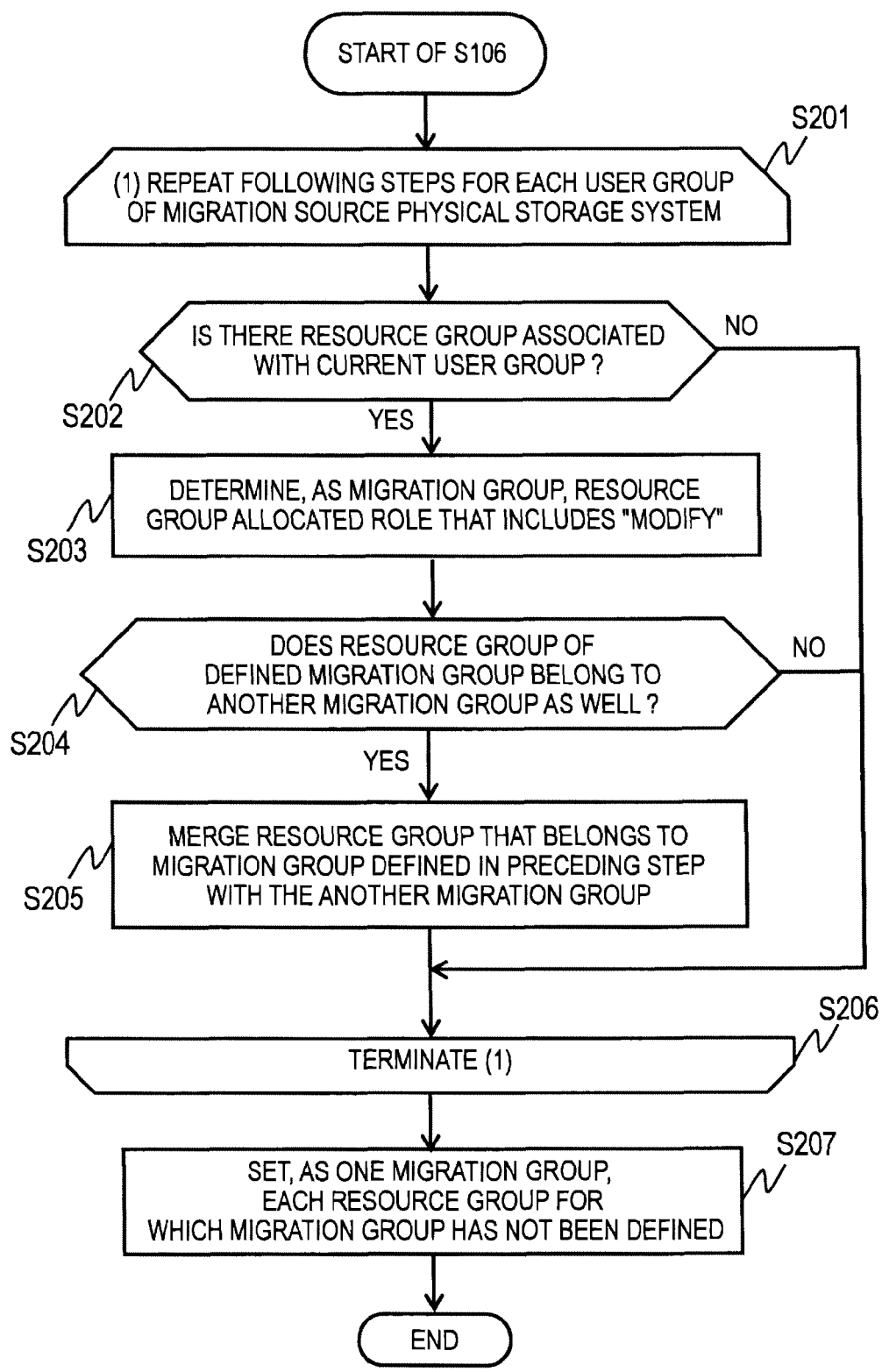
FIG. 19B is a flowchart illustrating an example of migration group defining processing in the first embodiment.

FIG. 19B is a flowchart illustrating an example of the migration group defining processing in Step S106 of FIG. 19A. The resource migration program 3330 determines migration groups based on users' management permissions.

In an example described below, the resource migration program 3330 selects, from resource groups managed by the respective users, resource groups allocated a role that includes "modify" (Role 2), and puts the selected resource groups in the same migration group. In the case where different migration groups include a common resource group, the resource migration program 3330 integrates these different migration groups into one migration group.

While migration groups in this example are defined based on a permission that includes "modify" (Role 2), which one of set management permissions is used in defining migration groups depends on the designs of the migration source physical storage system and the resource migration program 3330.

The resource migration program 3330 creates the migration group management table A 3321 and the migration group management table B 3322, stores an initial value (for example, a value null) in the created tables, and starts the flow of FIG. 19B. The resource migration program 3330 updates the migration group management table A 3321 and the migration group management table B 3322 appropriately in the flow of FIG. 19B.

In the flowchart of FIG. 19B, the resource migration program 3330 repeats Steps S201 to S206 for each of the user groups UG01 to UG03 of the migration source physical storage system 2000A.

In Step S202, the resource migration program 3330 determines whether or not a resource group associated with the selected user group has been registered. The resource migration program 3330 searches the resource group management table 2340 for the identifier of the selected user group, to thereby find a registered resource group that is associated (resource group for which the users have some management permission).

When there is a resource group associated with the selected user group (S202: yes), the resource migration program 3330 proceeds to Step S203. When there is no resource group associated with the selected resources (S202: no), the resource migration program 3330 proceeds to Step S206.

In Step S203, the resource migration program 3330 determines, for each resource group checked in Step S202, whether or not a role that includes "modify" (Role2) is allocated to the resource group. The resource migration program 3330 can find out for each resource group what role is allocated to the resource group in the resource group management table 2340.

The resource migration program 3330 further determines that resource groups allocated a role that includes "modify" are included in the same migration group, and temporarily defines a migration group constituted of these resource groups. Information of the temporarily defined migration group is stored in the memory 3300. The resource migration program 3330 then proceeds to Step S204.

In Step S204, the resource migration program 3330 determines whether or not a migration group has been defined temporarily in the preceding Step S203, and further determines whether or not a resource group belonging to the temporarily defined migration groups is included in another migration group which has been determined in a previous loop (loop for another user group). Information of migration groups determined in previous loops is stored in the migration group management table A 3321 and the migration group management table B 3322, which the resource migration program 3330 refers to.

In the case where none of resource groups of the migration group temporarily defined in the preceding Step S203 of this loop belongs to another migration group that has already been defined (S204: no), the resource migration program 3330 gives this migration group a new migration group ID, and registers information of this migration group in the migration group management table A 3321 and the migration group management table B 3322 (table update).

The resource migration program 3330 adds an entry holding the new migration group ID and one resource group ID or a plurality of resource group IDs that are associated with the migration group ID to the migration group management table A 3321. To the migration group management table B 3322, the resource migration program 3330 adds an entry holding the new migration group ID. The resource migration program 3330 can obtain information about the port count and volume capacity of the migration group from the configuration information (for example, the resource management table 2330) of the migration source physical storage system 2000A. Thereafter, the resource migration program 3330 proceeds to Step S206.

In the case where one of resource groups of the migration group temporarily defined in the preceding Step S203 of this loop is already defined for another migration group that is stored in the migration group management table A 3321 (S204: yes), the resource migration program 3330 proceeds to Step S205.

In Step S205, the resource migration program 3330 adds all resource groups that belong to the migration group temporarily defined in Step S203 of this loop to the migration group already defined in a loop for another user group (migration group defined in the migration group management table A 3321), and updates the migration group management table A 3321 and the migration group management table B 3322.

The resource migration program 3330 adds entries to the migration group management table A 3321 for resource groups belonging to the existing migration group. The resource migration program 3330 can obtain the port counts and volume capacities of the resource groups from the configuration information (for example, the resource management table 2330) of the migration source physical storage system 2000A, and adds up these values of the entries for the existing migration group.

The resource migration program 3330 deletes information of the migration group temporarily defined in Step S203 of this loop from the memory 3300, and proceeds to Step S206.

In Step S206, the resource migration program 3330 returns to Step S201 unless a repeated-processing ending condition of Step S201 is satisfied. When the repeated-processing ending condition of Step S201 is satisfied, the resource migration program 3330 proceeds to Step S207.

In Step S207, the resource migration program 3330 defines, as one migration group, each resource group for which a migration group to belong to has not been defined in Steps S201 to S206, updates (adds entries to) the migration group management table A 3321 and the migration group management table B 3322, and ends the processing. A migration group may be created from a plurality of resource groups for which no migration group has been defined.

Figure 19C:
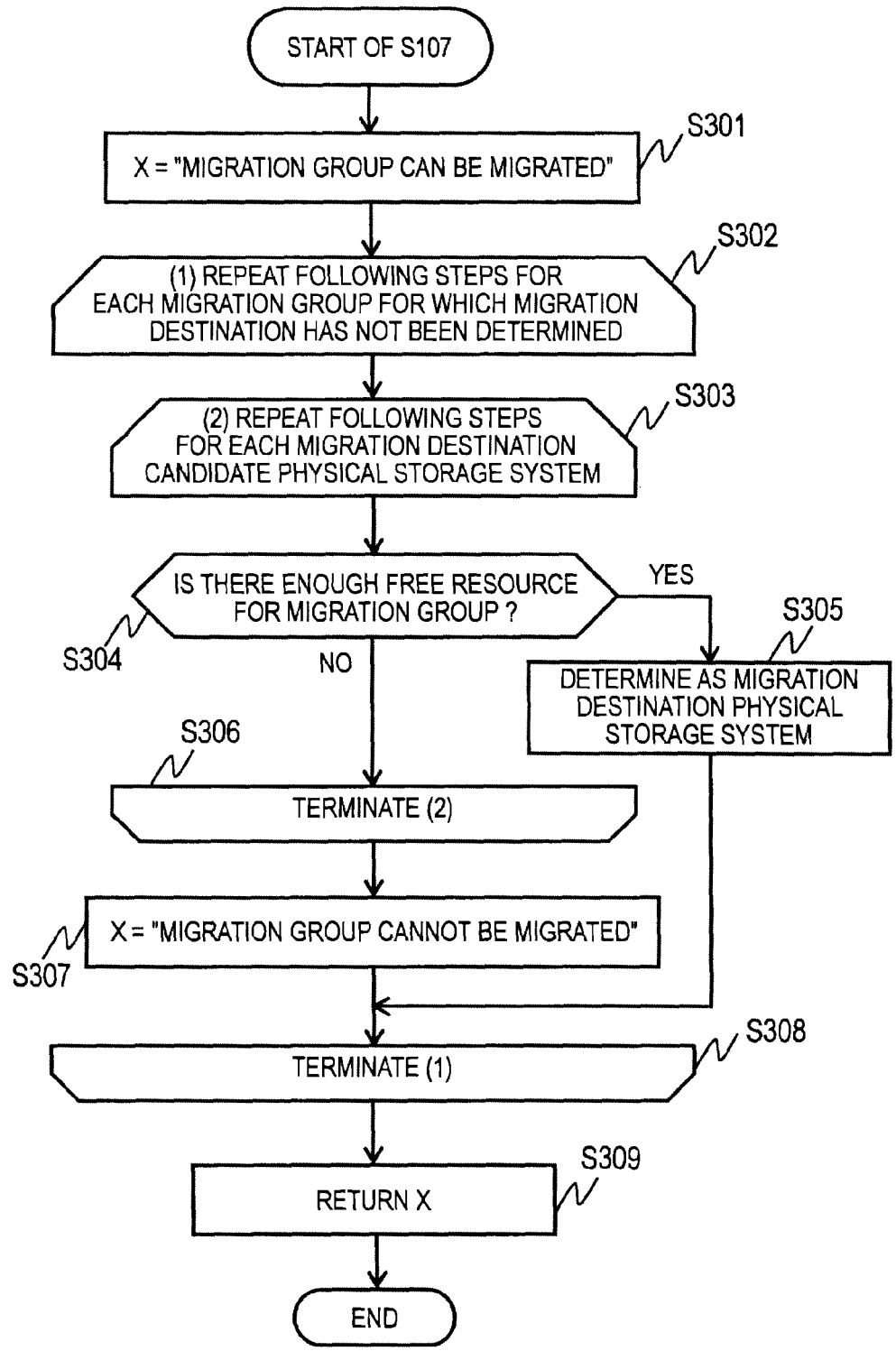
FIG. 19C is a flowchart illustrating an example of migration group migration destination determining processing in the first embodiment.

Details of Step S107 are described next with reference to FIG. 19C. FIG. 19C is a flowchart illustrating an example of the migration group migration destination determining processing of Step S107. In Step S301, the resource migration program 3330 first substitutes a value indicating that all the migration groups can be migrated to the virtual storage system 6000 in a return value X of Step S107. The resource migration program 3330 then proceeds to Step S302.

The resource migration program 3330 repeats Steps S302 to S308 for each migration group for which a migration destination has not been determined. The resource migration program 3330 further repeats Steps S304 and S305 for each of the migration destination candidate physical storage systems 2000B and 2000C.

In Step S304, the resource migration program 3330 determines whether or not the port count and volume capacity of the selected migration group can be secured in the selected migration destination candidate physical storage system.

The resource migration program 3330 refers to the already obtained configuration information of the migration source physical storage system 2000A and the migration destination candidate physical storage systems 2000B and 2000C to find out resources of the selected migration group and free resources of the selected migration destination candidate physical storage system 2000B or 2000C.

In the case where, in the determination of Step S304, there is already one migration group or a plurality of migration groups for which the selected migration destination candidate physical storage system has been determined as the migration destination, free resources in the selected migration destination candidate physical storage system that are compared against resources of the selected migration group do not include free resources that are allocated to the one migration group or the plurality of migration groups that have been determined.

The resource migration program 3330 refers to the migration group management table A 3321 to find out a migration group that is allocated to the selected migration destination candidate physical storage system, and further refers to the migration group management table B 3322 to find out the port count and volume capacity of the migration group.

In the case where the port count and volume capacity of the migration group can be secured in the selected migration destination candidate physical storage system (S304: yes), the resource migration program 3330 determines the selected physical storage system as the migration destination of this migration group (S305). The resource migration program 3330 stores the ID of the determined physical storage system in the migration destination storage ID field in an entry of the migration group management table A 3321 for the selected migration group.

In the case where the port count and volume capacity of the migration group cannot be secured in the selected migration destination candidate physical storage system (S304: no), the resource migration program 3330 proceeds to S306. In Step S306, the resource migration program 3330 determines whether or not a repeated-processing ending condition of Step S303 is satisfied. When the repeated-processing ending condition is not satisfied, the resource migration program 3330 proceeds to Step S303, and the resource migration program 3330 proceeds to Step S307 when the repeated-processing ending condition is satisfied.

The order in which the resource migration program 3330 selects migration destination candidate physical storage systems as targets for comparison of the count of unused resources and free capacity of each resource type between the migration source physical storage system 2000A and the migration destination candidate physical storage systems 2000B and 2000C, in other word, the migration destination candidate physical storage system selected first from the migration destination candidate physical storage systems 2000B and 2000C for Step S304 may be determined based on the information regarding the count of unused resources and free capacity of each resource type of the migration destination candidate physical storage systems 2000B and 2000C. For example, when considering the capacity balancing in the whole migration destination environment, Step S304 is performed in order of free capacity from the migration destination candidate physical storage system with the largest free capacity. Alternatively, the migration destination candidate physical storage system with the greatest number of free physical ports may be selected first, or the migration destination candidate physical storage system with the largest free capacity and the greatest number of free physical ports.

In Step S307, the resource migration program 3330 substitutes in the return value X a value indicating that there is a migration group that cannot be migrated to either of the migration destination candidate physical storage systems 2000B and 2000C, and proceeds to Step S308.

In Step S308, the resource migration program 3330 determines whether or not a repeated-processing ending condition of Step S302 is satisfied. The resource migration program 3330 proceeds to Step S302 when the repeated-processing ending condition is not satisfied, and proceeds to Step S309 when the repeated-processing ending condition is satisfied. In Step S309, the resource migration program 3330 returns the return value X of Step S107, and ends the processing.

As illustrated in FIGS. 17A and 17B, a migration group MG02 in this example can be migrated to the physical storage system 2000B (PSTB). A migration group MG01 cannot be migrated to either of the migration destination candidate physical storage systems 2000B and 2000C, and has no migration destination determined.

Specifically, as indicated by the migration group management table 3322B of FIG. 17B, the port count and volume capacity of the migration group MG01 are 4 and 550 GB, respectively. As indicated by the parity group management tables 2383B and 2383C of FIGS. 11C and 12C, the physical storage systems 2000B and 2000C each have a free capacity of 500 GB. Free resources of the physical storage system 2000B and free resources of the physical storage system 2000C are both not enough for the resource requirement of the migration group MG01.

The port count and volume capacity of the migration group MG02, on the other hand, are 2 and 100 GB, respectively, as indicated by the migration group management table 3322B of FIG. 17B. As indicated by the parity group management table 2383B (FIG. 11C) and host group management table 2381B (FIG. 11A) of the migration destination candidate physical storage system 2000B, the free capacity and free port count of the physical storage system 2000B are 500 GB and 4, respectively.

The migration group MG02 can accordingly be migrated to the migration destination candidate physical storage system 2000B, and the migration destination candidate physical storage system 2000B is selected as the migration destination of the migration group MG02.

In this example, when one of migration groups cannot be migrated (S108: no), the resource migration program 3330 checks the possibility of redefining migration groups. In the case where redefining migration groups is possible, the resource migration program 3330 redefines migration groups (S109). The resource migration program 3330 redefines migration groups in a manner that breaks up a migration group for which a migration destination has not been determined. This raises the chance of a migration group being successfully migrated.

Figure 19D:
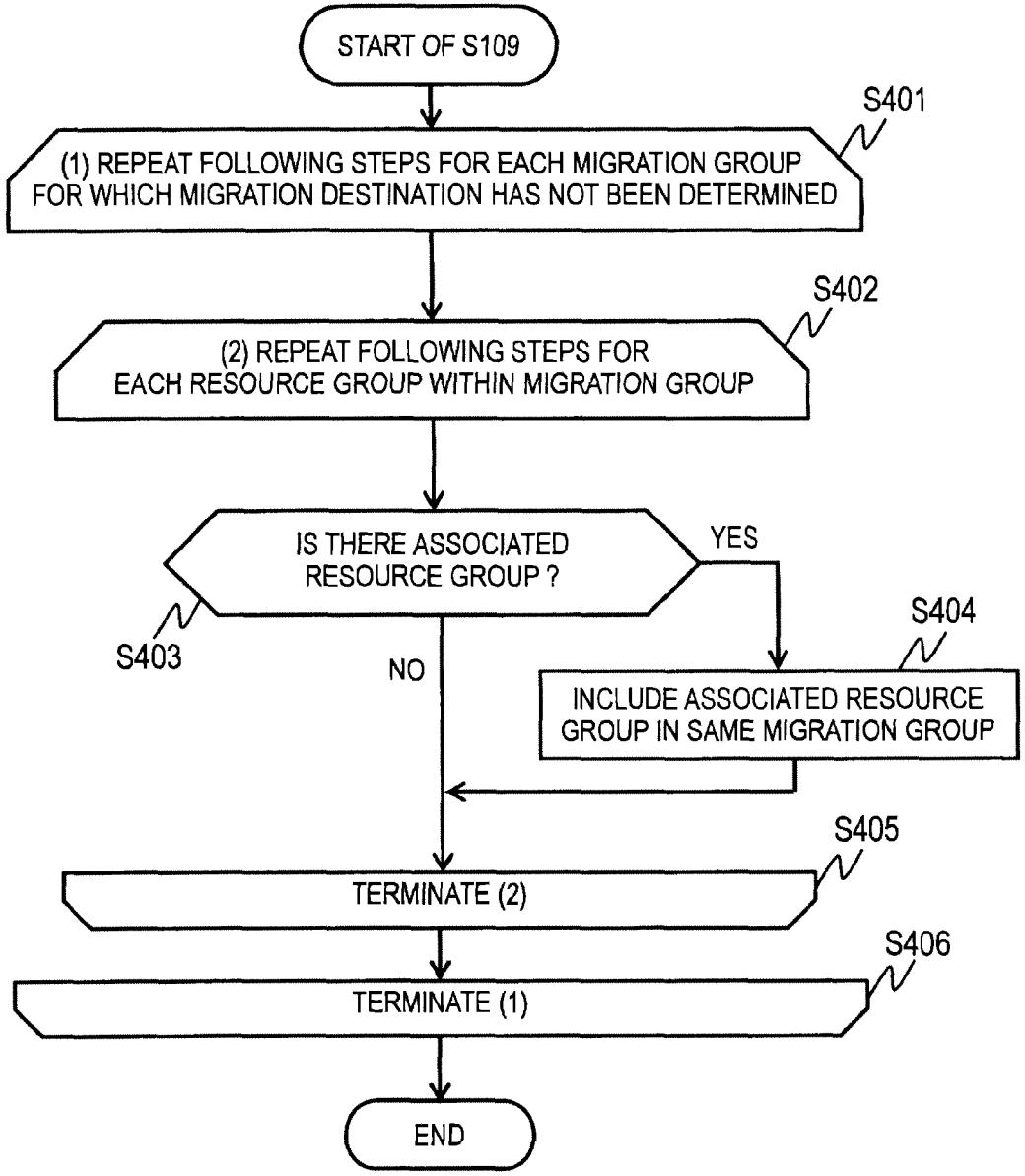
FIG. 19D is a flowchart illustrating an example of migration group redefining processing in the first embodiment.

Details of the migration group redefining processing in Step S109 are described with reference to FIG. 19D. FIG. 19D is a flowchart illustrating an example of the migration group redefining processing of Step S109. The resource migration program 3330 first repeats Steps S401 to S406 for each migration group for which a migration destination physical storage system has not been determined. The resource migration program 3330 further repeats Steps S402 to S405 for each resource group in the migration group.

In Step S403, the resource migration program 3330 determines whether or not there is a resource group that is associated with the selected resource group. The resource migration program 3330 refers to the associated resource group management table 2350 of the migration source physical storage system 2000A to identify an associated resource group of the selected resource group.

The resource migration program 3330 may select resources from the selected resource group one by one to search the configuration information of the migration source physical storage system 2000A for an associated resource. When one resource belonging to a resource group is associated with a resource of another resource group, these resource groups are associated with each other.

Resources that are associated with each other in this example are a volume and a port between which a path is set.

The resource migration program 3330 can identify a port or a volume that is associated with a volume or a port (identify a port or a volume that forms a set path with a volume or a port) by referring to the host group management table 2381A.

When it is found in Step S403 that the selected resource group is associated with another resource group in the same migration group (S403: yes), the resource migration program 3330 puts the associated resource group in a new migration group that is the same as the selected resource group (S404).

When it is found in Step S403 that the selected resource group is not associated with another resource group in the same migration group (S403: no), or after Step S404, the resource migration program 3330 proceeds to Step S405.

In Step S405, the resource migration program 3330 checks whether a repeated-processing ending condition of Step S402 is satisfied to move to Step S402 when the condition is not satisfied, and to proceed to Step S406 when the condition is satisfied. In Step S406, the resource migration program 3330 checks whether a repeated-processing ending condition of Step S401 is satisfied to move to Step S401 when the condition is not satisfied, and to end the processing when the condition is satisfied.

Through the flow described above, the resource migration program 3330 breaks up a migration group for which a migration destination has not been determined into a plurality of migration groups so that resource groups associated with each other are included in the same migration group. Every resource group that is not associated with any resource group forms one migration group. A plurality of migration groups each including one resource or a plurality of resources may be defined from a resource group that is not associated with any resource group. By reducing the count of migration groups that are generated by breaking up migration groups determined based on management permissions, the possibility of I/O performance deterioration at the migration destination is reduced.

A migration group constituted of resource groups that are not associated with each other can be broken up further. In the case where a migration destination cannot be determined for this migration group, the resource migration program 3330 may break up this migration group further, to thereby reduce the possibility of abnormal end caused by a failure to determine a migration destination. As long as resources associated with each other are included in one migration group, this migration group may include resources that are not associated with each other.

Each migration group generated by breaking up another migration group has fewer resources than the migration group that has been broken up does, which increases the possibility of the resource requirement of the migration group being fulfilled by free resources of a single physical storage system. In the case where all resource groups are associated resource groups, the resource migration program 3330 brings the processing to an abnormal end without breaking up the migration group for which a migration destination has not been determined.

As illustrated in FIGS. 18A and 18B, the migration group MG01 for which a migration destination has not been determined in Step S107 is broken into two migration groups, MG01 and MG03, in this example. The migration group MG01 before a migration destination is determined is constituted of the resource groups RSG01, RSG02, RSG04, and RSG05. The new migration group MG01 generated by breaking up the original migration group MG01 is constituted of the resource groups RSG01 and RSG04, and the migration group MG03 is constituted of the resource groups RSG02 and RSG05.

The redefined migration groups MG01 and MG03 are migrated to the physical storage systems 2000B (PSTB) and 2000C (PSTC), respectively, as indicated by the migration group management table A 3321 of FIG. 18A.

As indicated by the migration group management table B 3322 of FIG. 18B, the port count and capacity of the migration group MG01 are 2 and 350 GB, respectively. The free port count and free capacity of the migration destination candidate physical storage system 2000B are 4 and 500 GB, respectively, as indicated by the host group management table 2381B (FIG. 11A) and the parity group management table 2383B (FIG. 11C) of the migration destination candidate physical storage system 2000B (PSTB).

The port count and volume capacity of the migration group MG02 which is already allocated to the migration destination candidate physical storage system 2000B (PSTB) are 2 and 100 GB, respectively. The migration group MG01 can accordingly be migrated to the migration destination candidate physical storage system 2000B (PSTB).

The port count and capacity of the migration group MG03 are 2 and 200 GB, respectively, as indicated by the migration group management table B 3322 of FIG. 18B. The free port count and free capacity of the migration destination candidate physical storage system 2000C are 4 and 500 GB, respectively, as indicated by the host group management table 2381C (FIG. 12A) and the parity group management table 2383C (FIG. 12C) of the migration destination candidate physical storage system 2000C. The migration group MG03 can accordingly be migrated to the migration destination candidate physical storage system 2000C (PSTC).

Figure 20:
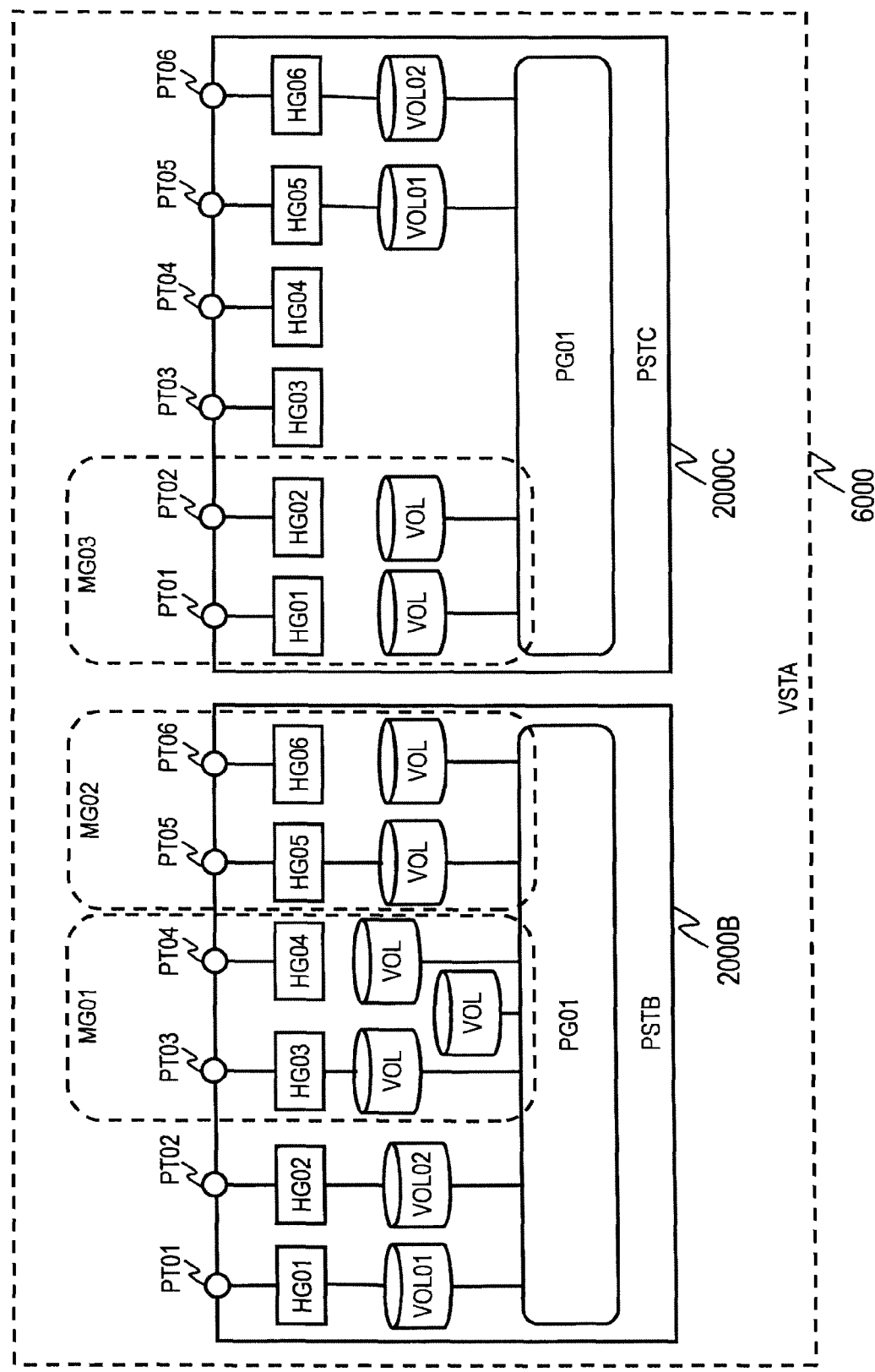
FIG. 20 is a diagram illustrating a configuration example of the migration destination virtual storage system after the completion of resource migration in the first embodiment.

FIG. 20 is a diagram schematically illustrating the configuration of the virtual storage system 6000 after resources are migrated by following the flowcharts of FIGS. 19A to 19D. FIG. 20 corresponds to the configurations of FIGS. 14, 18A, and 18B. The migration group MG01 is allocated two ports and two host groups (RSG01), as well as three volumes (RSG04), of the physical storage system 2000B.

The migration group MG02 is allocated two ports and two host groups (RSG03), as well as two volumes (RSG06), of the physical storage system 2000B. The migration group MG03 is allocated two ports and two host groups (RSG02), as well as two volumes (RSG05), of the physical storage system 2000C.

This embodiment reduces the possibility of host I/O performance deterioration that is caused by resource mapping between migration destination physical storage systems after resource migration from a migration source physical storage system to a migration destination virtual storage system that includes a plurality of migration destination physical storage systems.

In the example described above, resource groups are defined and a management permission is defined for each resource group. The management system may instead manage resources without defining resource groups, and manage permissions on a resource-by-resource basis. Similarly, the management system may not define user groups and host groups.

Second Embodiment

Figure 21:
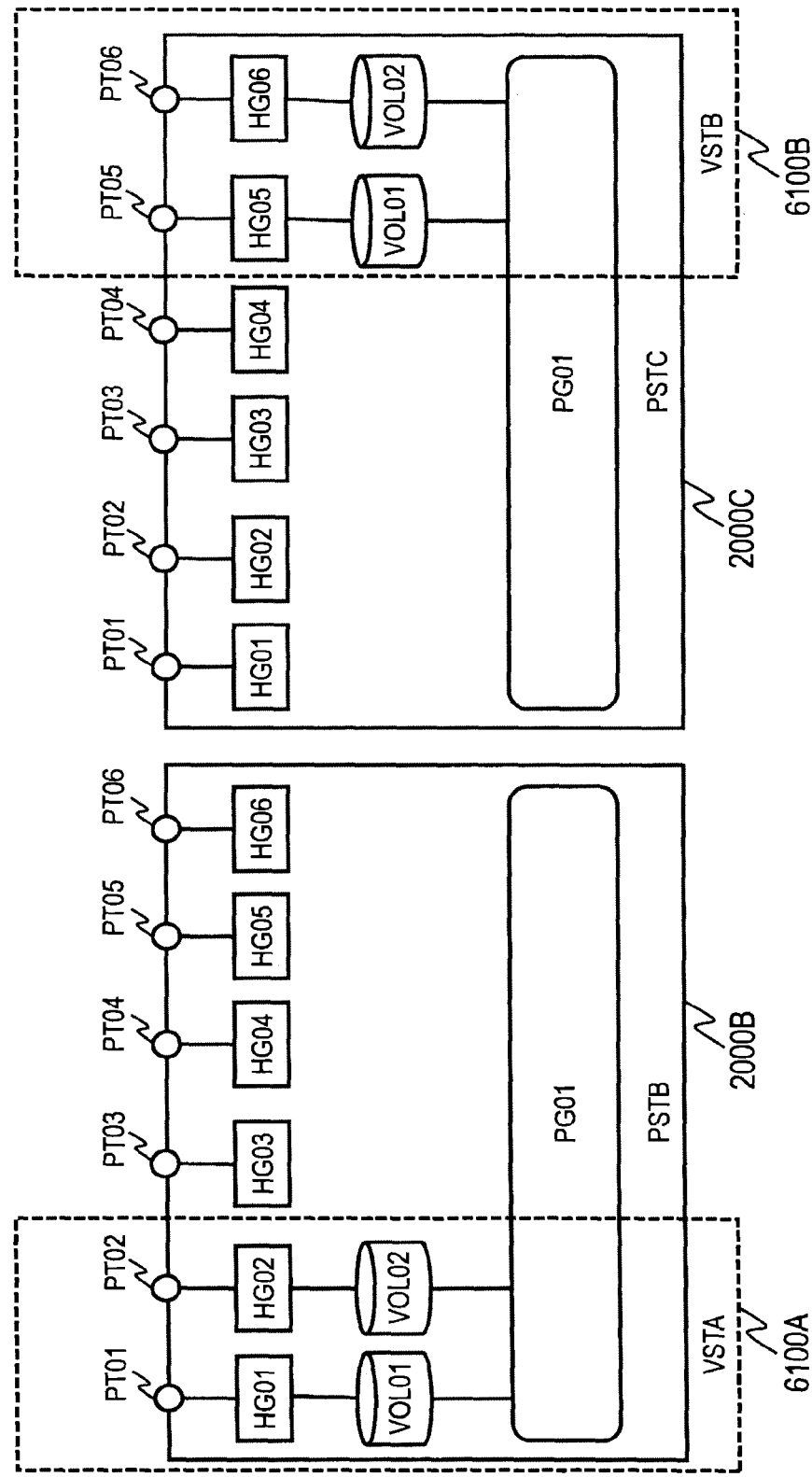
FIG. 21 is a diagram illustrating a configuration example of a migration destination virtual storage environment prior to resource migration in a second embodiment of this invention.

A second embodiment is described below. The description of the second embodiment focuses on differences from the first embodiment. FIG. 21 schematically illustrates a virtual storage environment which is a resource migration destination in a system of the second embodiment. In this example, a plurality of migration destination physical storage systems provide a plurality of virtual storage systems. Two physical storage systems, 2000B and 2000C, provide two virtual storage systems, 6100A and 6100B, in the example of FIG. 21.

The resource migration program 3330 determines a migration destination so that all migration target resources of the migration source physical storage system 2000A are migrated to one virtual storage system. After the destination of resource migration from the migration source physical storage system 2000A is determined, the management computer 3000 in the second embodiment defines virtual storage systems to map resources from the physical storage systems 2000B and 2000C onto the virtual storage systems. As in the first embodiment, the resource migration program 3330 migrates resources to one or both of the two physical storage systems 2000B and 2000C.

The resource migration program 3330 identifies free resources of each of the physical storage systems 2000B and 2000C and, when one of the physical storage systems 2000B and 2000C can provide all of the migration target resources, determines this physical storage system as the migration destination.

The resource migration program 3330 can identify free resources of the physical storage systems 2000B and 2000C from information on resources held by the physical storage systems 2000B and 2000C (for example, the storage configuration management table in the first embodiment), and from management information of resources that the physical storage systems 2000B and 2000C provide to the virtual storage systems 6100A and 6100B (virtual storage table 2385 described below).

FIG. 22 illustrates a configuration example of the virtual storage table 2385 which is included in the storage configuration management table 2380 of the migration source physical storage system 2000A in the second embodiment. The virtual storage table 2385 is used to manage configuration information of the virtual storage systems 6100A and 6100B in the migration destination virtual environment.

The virtual storage table 2385 in FIG. 22 includes a virtual storage ID column 2385a, a physical storage ID column 2385b, a resource type column 2385c, and a resource ID column 2385d.

The virtual storage ID column 2385a stores the identifier of a virtual storage system included in the migration destination. The physical storage ID column 2385b stores, for each virtual storage ID, the identifier of a physical storage system that provides resources to the virtual storage system. The resource type column 2385c stores an identifier that indicates the type of a resource mapped from a physical storage system onto a virtual storage system. The resource ID column 2385d stores the identifier of a resource mapped from a physical storage system to a virtual storage system.

The resource migration program 3330 executes processing of determining a resource migration destination the same way as in the first embodiment. In the case where one of the physical storage systems 2000B and 2000C can provide all of migration target resources, the resource migration program 3330 determines to migrate all resources to this physical storage system. In the case where neither of the physical storage systems 2000B and 2000C can provide all of migration target resources, the resource migration program 3330 determines a migration destination for each migration group that is determined based on management permissions.

Figure 23:
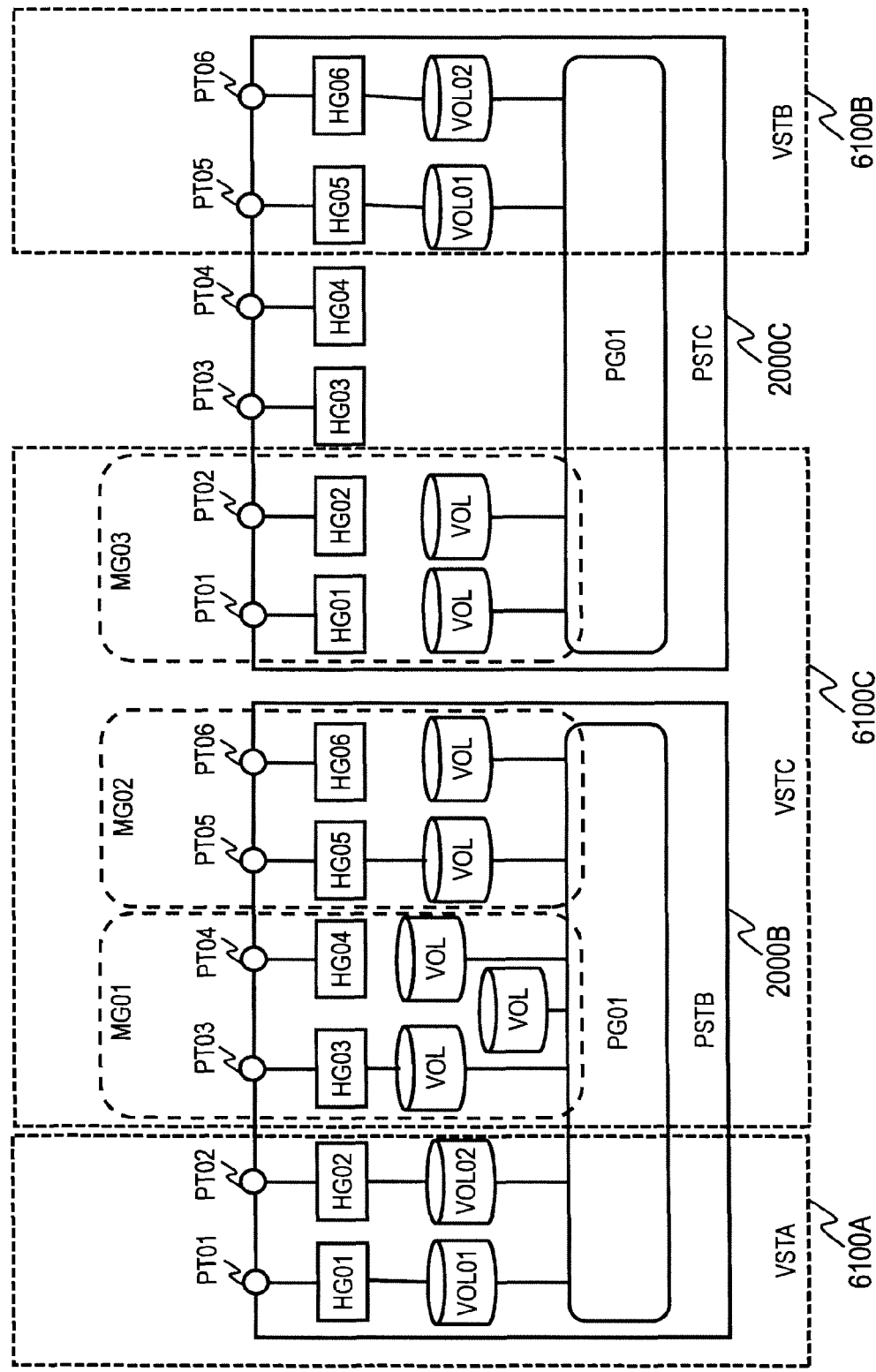
FIG. 23 is a diagram illustrating a configuration example of the migration destination virtual storage environment after the completion of resource migration in the second embodiment.

FIG. 23 illustrates the schematic configuration of the migration destination virtual storage systems after resource migration. In this example, after the destination of resource migration from the migration source physical storage system 2000A is determined, a virtual storage system 6100C (VSTC) is newly defined to map resources that have been migration targets onto the virtual storage system 6100C (VSTC).

This embodiment reduces the possibility of host I/O performance deterioration that is caused by resource mapping between migration destination physical storage systems after resource migration from a migration source physical storage system to a plurality of physical storage systems of a migration destination virtual storage environment. With this embodiment, a virtual storage system that contains all of migration target resources can be configured appropriately.

The invention claimed is:

1. A management system for managing a first physical storage system and a plurality of physical storage systems which provide a plurality of resources to a virtual storage system recognized by a host as one storage system, the management system comprising:
    a memory for storing management permission information, which associates a plurality of resources included in the first physical storage system with permissions of a plurality of administrators; and
    a processor configured to determine migration destinations of the plurality of resources included in the first physical storage system, with the plurality of physical storage systems as migration destination candidates,
    wherein the processor is configured to refer to the management permission information to identify resources for which predetermined management permissions are respectively assigned to the plurality of administrators in the first physical storage system,
    wherein the processor is configured to define at least one migration group from the plurality of resources included in the first physical storage system such that resources for which the predetermined management permissions are assigned to the same administrator are included in the same migration group, and
    wherein the processor is configured to determine at least one migration destination of the at least one migration group, on a condition that resources in the same migration group are migrated to the same physical storage system among the plurality of physical storage systems.

2. The management system according to claim 1,
    wherein the memory further configured to store first information about a configuration of the plurality of resources included in the first physical storage system, second information about free resources of each of the plurality of physical storage systems, and third information defining associations in terms of configuration among the plurality of resources included in the first physical storage system,
    wherein the processor is configured to refer to the first information and the second information to determine the at least one migration destination of the at least one migration group,
    wherein the at least one migration group includes a first migration group and, in a case where resources of the first migration group cannot be migrated to the same physical storage system, the processor is configured to refer to the third information to identify associated resources that are associated with each other in terms of configuration in the first migration group,
    wherein the processor is configured to redefine from the first migration group a plurality of migration groups including a second migration group that comprises the identified associated resources, and wherein the processor is configured to refer to the first information and the second information to determine migration destinations for the plurality of redefined migration groups.

3. The management system according to claim 2, wherein the processor is configured to define one migration group from a plurality of resources in the first migration group that are not associated with other resources.

4. The management system according to claim 1,
wherein the memory further stores resource group information for managing a plurality of resource groups to which the plurality of resources included in the first physical storage system belong,
wherein the management permission information associates the plurality of resource groups with management permissions that are assigned to the plurality of administrators in regard to the plurality of resource groups, and
wherein the processor defines the at least one migration group from the plurality of resource groups.

5. The management system according to claim 1, wherein, in a case where different migration groups defined based on the predetermined management permissions of different administrators include a resource common to one another, the processor is configured to integrate the different migration groups to define one migration group.

6. The management system according to claim 1,
wherein the memory further stores first information about a configuration of the plurality of resources included in the first physical storage system, and second information about free resources of each of the plurality of physical storage systems,
wherein the processor is configured to refer to the first information and the second information to determine whether or not the plurality of resources included in the first physical storage system can be migrated to a single physical storage system among the plurality of physical storage systems, and
wherein, in a case where it is determined that the plurality of resources included in the first physical storage system can be migrated to a single physical storage system, the processor is configured to determine to migrate the plurality of resources of the first physical storage system to the single physical storage system.

7. The management system according to claim 1, wherein, after determining the at least one migration destination of the at least one migration group, the processor is configured to define the virtual storage system in the plurality of physical storage systems.

8. The management system according to claim 1, wherein:
the processor is configured to determine whether or not the plurality of resources included in the first physical storage system can be migrated to a single physical storage system among the plurality of physical storage systems, and
when it is determined that the plurality of resources included in the first physical storage system cannot be migrated to a single physical storage system, the processor is configured to define the at least one migration group from the plurality of resources included in the first physical storage system.

9. The management system according to claim 1, wherein:
the processor is configured to determine whether each of the at least one migration group can be migrated to at least one of the migration destination candidates, and
when it is determined that a particular one of the at least one migration group cannot be migrated to at least one of the migration destination candidates, the processor is configured to break up the particular migration group into a plurality of migration groups.

10. A method by a management system for determining at least one migration destination for a plurality of resources of one migration source physical storage system, with a plurality of physical storage systems, which provide a plurality of resources to a virtual storage system recognized by a host as one storage system, as migration destination candidates, the method comprising:
identifying, by the management system, resources for which predetermined management permissions are respectively assigned to a plurality of administrators in the migration source physical storage system;
defining, by the management system, at least one migration group from the plurality of resources included in the migration source physical storage system such that resources for which the predetermined management permissions are assigned to the same administrator are included in the same migration group; and
determining, by the management system, at least one migration destination of the at least one migration group, on a condition that resources in the same migration group are migrated to the same physical storage system among the plurality of physical storage systems.

11. The method according to claim 10,
wherein the at least one migration group includes a first migration group, and
wherein the method further comprises:
in a case where resources of the first migration group cannot be migrated to the same physical storage system, identifying, by the management system, associated resources that are associated with each other in terms of configuration in the first migration group;
redefining, by the management system, from the first migration group a plurality of migration groups including a second migration group that comprises the identified associated resources; and
determining, by the management system, migration destinations for the plurality of redefined migration groups.

12. The method according to claim 10, further comprising:
defining a plurality of resource groups to which the plurality of resources included in the migration source physical storage system belongs;
defining, for the plurality of resource groups, management permissions that are assigned to the plurality of administrators in regard to the plurality of resource groups;
identifying, by the management system, resource groups for which the predetermined management permissions are respectively assigned to the plurality of administrators; and
defining, by the management system, the at least one migration group from the plurality of resource groups.

13. The method according to claim 10, further comprising:
determining whether or not the plurality of resources included in the migration source physical storage system can be migrated to a single physical storage system among the plurality of physical storage systems, and
defining, when it is determined that the plurality of resources included in the migration source physical storage system cannot be migrated to a single physical storage system, the at least one migration group from the plurality of resources included in the migration source physical storage system.

14. The method according to claim 10, further comprising:
determining whether each of the at least one migration group can be migrated to at least one of the migration destination candidates, and breaking up, when it is determined that a particular one of the at least one migration group cannot be migrated to at least one of the migration destination candidates, the particular migration group into a plurality of migration groups.

15. A computer-readable non-transitory storage medium for storing instructions which, in a case where executed on a management system, cause the management system to execute processing of determining at least one migration destination for a plurality of resources of one migration source physical storage system, with a plurality of physical storage systems, which provide a plurality of resources to a virtual storage system recognized by a host as one storage system, as migration destination candidates, the processing comprising:
   identifying resources for which predetermined management permissions are respectively assigned to a plurality of administrators in the migration source physical storage system;
   defining at least one migration group from the plurality of resources included in the migration source physical storage system such that resources for which the predetermined management permissions are assigned to the same administrator are included in the same migration group; and
   determining at least one migration destination of the at least one migration group, on a condition that resources in the same migration group are migrated to the same physical storage system among the plurality of physical storage systems.

16. The computer-readable non-transitory storage medium according to claim 15, wherein the processing further comprises referring to information about a configuration of the plurality of resources included in the migration source physical storage system, and information about free resources of each of the plurality of physical storage systems to determine the at least one migration destination of the at least one migration group.

17. The computer-readable non-transitory storage medium according to claim 15, wherein the processing further comprises integrating different migration groups to define one migration group in a case where the different migration groups defined based on the predetermined management permissions of different administrators include a resource common to one another.

18. The computer-readable non-transitory storage medium according to claim 15, wherein the processing further comprises:
   determining whether or not the plurality of resources included in the migration source physical storage system can be migrated to a single physical storage system among the plurality of physical storage systems, and
   defining, when it is determined that the plurality of resources included in the migration source physical storage system cannot be migrated to a single physical storage system, the at least one migration group from the plurality of resources included in the migration source physical storage system.

19. The computer-readable non-transitory storage medium according to claim 15, wherein the processing further comprises:
   determining whether each of the at least one migration group can be migrated to at least one of the migration destination candidates, and
   breaking up, when it is determined that a particular one of the at least one migration group cannot be migrated to at least one of the migration destination candidates, the particular migration group into a plurality of migration groups.

* * * * *